United States Patent
Kim et al.

(10) Patent No.: US 12,439,178 B2
(45) Date of Patent: Oct. 7, 2025

(54) IMAGE SENSOR AND OPERATING METHOD THEREOF

(71) Applicant: SAMSUNG ELECTRONICS CO., LTD., Suwon-si (KR)

(72) Inventors: Kyungmin Kim, Suwon-si (KR); Dongkyun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 18/462,874

(22) Filed: Sep. 7, 2023

(65) Prior Publication Data

US 2024/0098380 A1    Mar. 21, 2024

(30) Foreign Application Priority Data

Sep. 21, 2022  (KR) .......................... 10-2022-0119546

(51) Int. Cl.
*H04N 25/627* (2023.01)
*H04N 25/78* (2023.01)

(52) U.S. Cl.
CPC ........... *H04N 25/627* (2023.01); *H04N 25/78* (2023.01)

(58) Field of Classification Search
CPC .............................. H04N 25/627; H04N 25/78
USPC ..................................................... 348/207.99
See application file for complete search history.

(56) References Cited

U.S. PATENT DOCUMENTS

| | | | |
|---|---|---|---|
| 7,920,181 B2 | 4/2011 | Kokubo et al. |
| 8,223,228 B2 | 7/2012 | Shirai et al. |
| 11,165,978 B2 | 11/2021 | Kobuse et al. |
| 11,206,392 B1 | 12/2021 | Zuo et al. |
| 2005/0057693 A1 | 3/2005 | Nakakuki |

FOREIGN PATENT DOCUMENTS

| | | | |
|---|---|---|---|
| CN | 112261325 | | 1/2021 |
| JP | 2007028292 | * | 2/2007 |
| KR | 10-2009-0031174 | | 3/2009 |

* cited by examiner

*Primary Examiner* — Joel W Fosselman
(74) *Attorney, Agent, or Firm* — Morgan , Lewis & Bockius LLP

(57) ABSTRACT

An image sensor includes a pixel array including a plurality of pixels operating in a plurality of modes, a readout circuit configured to receive a pixel signal corresponding to each of the plurality of modes from each of the pixels and generate a pixel value that is a digital signal from the pixel signal, and a signal processor configured to determine whether a target pixel value is a black spot generation value for each of the pixels based on at least one of comparison pixel values of each comparison mode among a plurality of comparison modes having a smaller output gain than a target mode corresponding to the target pixel value, and correct the target pixel value when the target pixel value is the black spot generation value.

20 Claims, 13 Drawing Sheets

IMAGE SENSOR AND OPERATING METHOD THEREOF

CROSS-REFERENCE TO RELATED APPLICATION

This application is based on and claims priority under 35 U.S.C. § 119 to Korean Patent Application No. 10-2022-0119546, filed on Sep. 21, 2022 in the Korean Intellectual Property Office, the disclosure of which is incorporated by reference herein in its entirety.

TECHNICAL FIELD

Embodiments of the inventive concept relate to an image sensor and an operating method of the image sensor, and more particularly, to an image sensor that corrects a pixel value corresponding to an operating mode of a pixel and an operating method of the image sensor.

DISCUSSION OF RELATED ART

An image sensor is a device that captures a two-dimensional or three-dimensional image of an object. The image sensor generates an image of an object using a photoelectric conversion element that reacts according to the intensity of light reflected from the object.

With the recent development of Complementary Metal-Oxide Semiconductor (CMOS) technology, CMOS image sensors using CMOS are becoming more widely used. It is typically desirable for an image sensor to have high resolution and good noise characteristics to generate high quality images.

SUMMARY

Embodiments of the inventive concept provide an image sensor and an operating method thereof that removes black spots from an image using pixel values corresponding to each of a plurality of operation modes of a pixel, and generates an image with improved noise characteristics.

According to an embodiment of the inventive concept, an image sensor including a pixel array including a plurality of pixels that operate in a plurality of modes, a readout circuit configured to receive a pixel signal corresponding to each of the plurality of modes from each of the pixels and generate a pixel value that is a digital signal from the pixel signal, and a signal processor configured to determine whether a target pixel value is a black spot generation value for each of the pixels based on at least one of comparison pixel values of each comparison mode among a plurality of comparison modes having a smaller output gain than a target mode corresponding to the target pixel value, and correct the target pixel value when the target pixel value is the black spot generation value.

According to an embodiment of the inventive concept, an image sensor includes a pixel array including a plurality of pixels each including a first photoelectric conversion element and a second photoelectric conversion element having a larger light-receiving area than the first photoelectric conversion element, and a plurality of pixels each operating in a first mode, a second mode, a third mode and a fourth mode, a readout circuit configured to receive pixel signals corresponding to the first to fourth modes from each of the plurality of pixels and generate first to fourth pixel values that are digital signals, and a signal processor configured to determine whether each of the plurality of pixels has a pixel value that is a black spot generation value based on at least one of a first pixel value in the first mode, a second pixel value in the second mode, a third pixel value in the third mode, and a fourth pixel value in the fourth mode, determine whether the second pixel value is the black spot generation value based on at least one of the third pixel value and the fourth pixel value, and determine whether the third pixel value is the black spot generation value based on the fourth pixel value. The first mode has a larger output gain than the second mode, the second mode has a larger output gain than the third mode, and the third mode has a larger output gain than the fourth mode.

According to an embodiment of the inventive concept, an operating method of an image sensor including a plurality of pixels operating in a plurality of modes includes receiving a pixel value corresponding to each of the plurality of modes, determining whether a target pixel value is a black spot generation value based on at least one of comparison pixel values of each comparison mode among a plurality of comparison modes having a smaller output gain than a target mode corresponding to the target pixel value, and correcting the target pixel value based on whether the target pixel value is the black spot generation value.

BRIEF DESCRIPTION OF THE DRAWINGS

The above and other features of the inventive concept will become more apparent by describing in detail embodiments thereof with reference to the accompanying drawings, in which.

DETAILED DESCRIPTION OF THE EMBODIMENTS

Figure 1:
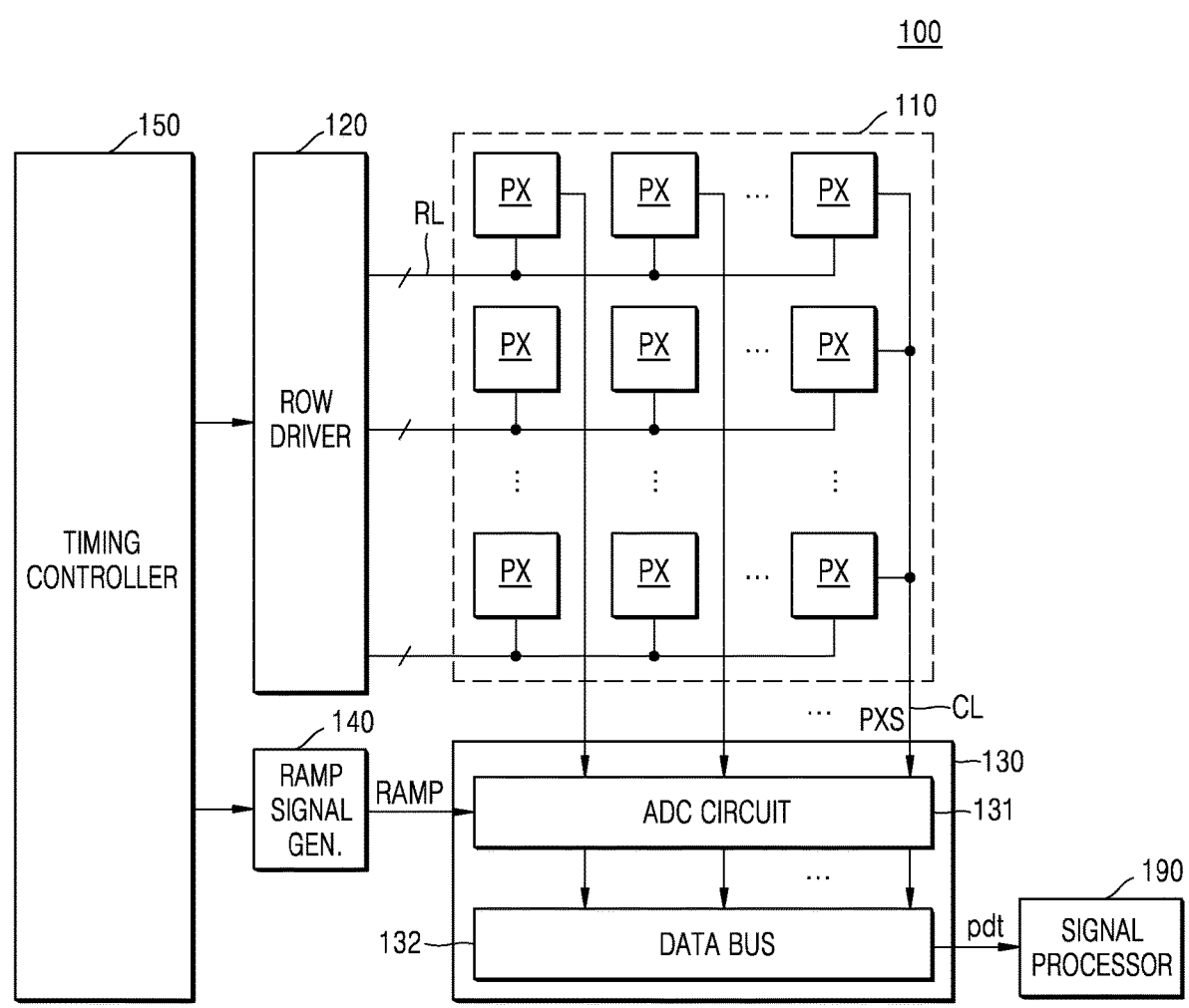
FIG. 1 is a block diagram illustrating an image sensor according to an embodiment of the present disclosure.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. Other words used to describe the relationships between components should be interpreted in a like fashion.

As used herein, the term "and/or" includes any and all combinations of one or more of the associated listed items.

FIG. 1 is a block diagram illustrating an image sensor 100 according to an embodiment of the present disclosure.

The image sensor 100 may be mounted on an electronic device having an image or light sensing function. For example, the image sensor 100 may be mounted on electronic devices such as cameras, smartphones, wearable devices, Internet of Things (IoT) devices, home appliances, tablet personal computers (PCs), personal digital assistants (PDAs), portable multimedia players (PMPs), navigation devices, drones, and advanced drivers assistance systems (ADAS). In addition, the image sensor 100 may be mounted on an electronic device provided as a component for vehicles, furniture, manufacturing facilities, doors, various measuring devices, and the like.

Referring to FIG. 1, the image sensor 100 may include a pixel array 110, a row driver 120, a readout circuit 130, a ramp signal generator 140, a timing controller 150, and a signal processor 190. The readout circuit 130 may include an analog-to-digital conversion circuit 131 (hereinafter referred to as an ADC circuit) and a data bus 132.

The pixel array 110 includes a plurality of row lines RL, a plurality of column lines CL, and a plurality of pixels PX connected to the plurality of row lines RL and the plurality of column lines CL, and arranged in a matrix formation. In an embodiment, the plurality of pixels PX may be an active pixel sensor (APS).

Each of the plurality of pixels PX may include at least one photoelectric conversion element, and the pixel PX may sense light using a photoelectric conversion element, and may output an image signal that is an electrical signal according to the sensed light. For example, the photoelectric conversion element may be a photo-sensing element made of an organic material or an inorganic material, such as inorganic photodiodes, organic photodiodes, perovskite photodiodes, phototransistors, photogates, or pinned photodiodes. In an embodiment, each of the plurality of pixels PX may include a plurality of photoelectric conversion elements.

According to embodiments, a microlens that condenses light may be disposed above each of the plurality of pixels PX or above each of pixel groups composed of adjacent pixels PX. Each of the plurality of pixels PX may detect light in a certain spectral region from light received through the microlens. For example, the pixel array 110 may include a red pixel that converts light in the red spectral region into electrical signals, a green pixel that converts light in the green spectral region into an electrical signal, and a blue pixel that converts light in the blue spectrum region into an electrical signal. A color filter that transmits light in a certain spectral region may be disposed above each of the plurality of pixels PX. However, the inventive concept is not limited thereto. For example, according to embodiments, the pixel array 110 may include pixels that convert light in a spectral region other than red, green, and blue into electrical signals.

In an embodiment, the plurality of pixels PX may have a multi-layer structure. The multi-layered pixel PX includes a plurality of stacked photoelectric conversion elements that convert light in different spectral regions into electrical signals, and electrical signals corresponding to different colors may be generated from a plurality of photoelectric conversion elements. In other words, electrical signals corresponding to a plurality of colors may be output from one pixel PX.

A color filter array that transmits light in a certain spectral region may be disposed on the plurality of pixels PX, and a color detectable by a corresponding pixel may be determined according to a color filter disposed on each of the plurality of pixels PX. However, the inventive concept is not limited thereto. For example, according to embodiments, in the case of a certain photoelectric conversion element, depending on the level of the electrical signal applied to the photoelectric conversion element, light in a certain wavelength band may be converted into an electrical signal.

In an embodiment, as described below with reference to FIGS. 2A and 2B, each of the plurality of pixels PX may provide two or more conversion gains. In some embodiments, as described below with reference to FIG. 2B, a pixel may include two or more photoelectric conversion elements. Each of the plurality of pixels PX may operate in a plurality of modes. In an embodiment, each of the plurality of pixels PX may operate in a plurality of modes according to at least one of a conversion gain and at least one photoelectric conversion element. For example, each of the plurality of pixels PX may operate in two modes, three modes, or four modes. However, the inventive concept is not necessarily limited to the listed examples.

Each of the plurality of pixels PX may generate a pixel signal PXS corresponding to each of a plurality of modes. For example, each of the plurality of pixels PX may operate in a first mode in which a first pixel signal is generated, and operate in a second mode in which a second pixel signal is generated. In an embodiment, the pixel signal PXS corresponding to each of the plurality of modes may be generated within one frame section in which the pixel array 110 is scanned. For example, the first pixel signal and the second pixel signal may be generated within the first frame section. In an embodiment, the pixel signal PXS corresponding to each of a plurality of modes may be generated within a plurality of frame sections. For example, a first pixel signal may be generated within a first frame section and a second pixel signal may be generated within a second frame section. However, the inventive concept is not limited thereto.

The row driver 120 drives the pixel array 110 in units of rows. The row driver 120 may decode a row control signal (e.g., an address signal) received from the timing controller 150, and may select at least one row line from among row lines constituting the pixel array 110 in response to the decoded row control signal. For example, the row driver 120 may generate a selection signal used to select one of a plurality of rows. In addition, the pixel array 110 outputs the pixel signal PXS from a row selected by the selection signal provided from the row driver 120.

The row driver 120 may transmit control signals used to output the pixel signal PXS to the pixel array 110, and the pixel PX may output the pixel signal PXS by operating in response to the control signals. For example, the row driver 120 may generate control signals used to control the pixels PX to operate in a plurality of modes during the readout period and provide the generated control signals to the pixel array 110.

The ramp signal generator 140 may generate a ramp signal RAMP that increases or decreases with a preset slope and provide the ramp signal RAMP to the ADC circuit 131 of the readout circuit 130.

The readout circuit 130 may read out a pixel signal PXS from the pixels PX of a row selected by the row driver 120 among the plurality of pixels PX. In this case, the pixel signal PXS may include a reset signal or an image signal (or sensing signal). The readout circuit 130 converts reset signals and image signals received from the pixel array 110 through a plurality of column lines CL into digital signals based on the ramp signal RAMP received from the ramp signal generator 140 to generate and output pixel values pdt corresponding to the plurality of pixels PX in units of rows. The readout circuit 130 may generate pixel values pdt corresponding to a plurality of modes from the pixel signal PXS corresponding to the plurality of modes.

The ADC circuit 131 may include a plurality of ADCs corresponding to a plurality of column lines CL. Each of the plurality of ADCs may compare a reset signal and an image signal received through a corresponding column line CL with a ramp signal RAMP, respectively, and generate a pixel value pdt based on the comparison results. For example, the ADC may remove the reset signal from the image signal and generate a pixel value pdt indicating the amount of light detected by the pixel PX.

A plurality of pixel values pdt generated by the ADC circuit 131 may be output through the data bus 132. For example, the pixel value pdt may be provided to the signal processor 190.

The data bus 132 may temporarily store pixel values pdt output from the ADC circuit 131 and then output the stored pixel values pdt. The data bus 132 may include a plurality of column memories and a column decoder. The plurality of pixel values pdt stored in the plurality of column memories may be output to the signal processor 190 under the control of the column decoder.

The ADC circuit 131 may include a plurality of Correlated Double Sampling (CDS) circuits and a plurality of counter circuits. The ADC circuit 131 may convert the pixel signal PXS input from the pixel array 110 into a pixel value pdt that is a digital signal. Each pixel signal PXS received through each of the plurality of column lines CL is converted into a pixel value pdt, which is a digital signal, by the CDS circuit and the counter circuit.

The CDS circuit may compare the pixel signal PXS received through the column line CL with the ramp signal RAMP and output a comparison result. When the level of the ramp signal RAMP and the level of the pixel signal PXS are the same, the CDS circuit may output a comparison signal that transitions from a first level (e.g., logic high) to a second level (e.g., logic low). The time point at which the level of the comparison signal transitions may be determined according to the level of the pixel signal PXS.

The CDS circuit may sample and hold a pixel signal PXS provided from a pixel PX according to a correlated double sampling (CDS) method, and may generate a comparison signal based on a level corresponding to the difference by double sampling a level of a certain noise (e.g., a reset signal) and a level according to the image signal.

In some embodiments, the CDS circuit may include one or more comparators. The comparator may be implemented as, for example, an Operational Transconductance Amplifier (OTA) (or differential amplifier).

The signal processor 190 may receive the pixel value pdt from the readout circuit 130. The signal processor 190 may perform, for example, noise reduction processing, gain adjustment, waveform shaping processing, interpolation processing, white balance processing, gamma processing, edge enhancement processing, binning, and the like on the pixel value pdt.

In an embodiment, the signal processor 190 may determine whether the pixel value pdt is a black spot generation value. The black spot generation value may refer to a value that generates black spots in an image generated by the signal processor 190. At high luminance, when the charge overflows from the photoelectric conversion element, the reset signal value becomes small, and a pixel signal PXS with a reduced difference between the image signal and the reset signal may be generated. When an image is generated based on the pixel signal PXS in which the difference between the reset signal and the image signal is reduced, a black spot, which is a phenomenon in which black appears in the image, may occur.

The signal processor 190 may receive a pixel value pdt corresponding to each of a plurality of modes from the readout circuit 130. The signal processor 190 may determine whether the target pixel value is a black spot generation value. The target pixel value may refer to a pixel value that may be used to determine whether the target pixel value is a black spot generation value among pixel values pdf corresponding to a plurality of modes.

The signal processor 190 may determine whether the target pixel value is a black spot generation value based on at least one of the comparison pixel values. The comparison pixel value may refer to a pixel value pdt of each comparison mode having a smaller output gain than that of the target mode corresponding to the target pixel value among the pixel values pdt corresponding to each of the plurality of modes. Each of the plurality of modes may have different output gains. The output gain refers to the pixel value pdt according to the luminance, and the luminance at which the pixel value pdt is saturated may be different according to the operation mode of the pixel. For example, when a first pixel value of the first mode is saturated at a lower luminance than a second pixel value of the second mode, the output gain of the first mode may be greater than that of the second mode. The output gain will be described below in detail with reference to FIG. 3.

For example, it is assumed that the first mode, the second mode, and the third mode, which are operation modes of the pixels, have large output gains in the order in which they are listed. If the first pixel value of the first mode is the target pixel value, the target mode may be the first mode, and the comparison mode may be the second mode and the third mode. The second pixel value of the second mode and the third pixel value of the third mode may be comparison pixel values. The signal processor 190 may determine whether the first pixel value is a black spot generation value based on at least one of the second pixel value and the third pixel value. If the pixel value of the second mode is the target pixel value, the pixel value of the third mode may be the comparison pixel value. The signal processor 190 may determine whether the second pixel value is a black spot generation value based on the third pixel value.

The signal processor 190 may correct the target pixel value when determining the target pixel value as the black spot generation value. When the target pixel value is the black spot generation value, the signal processor 190 may correct the target pixel value to a maximum output value. The maximum output value may refer to a pixel value pdt saturated in each of a plurality of modes of a pixel. Pixel values pdt saturated in each of the plurality of modes may be the same. For example, the signal processor 190 may read the maximum output value stored in the memory of the image sensor 100 and correct the value of the target pixel value to the maximum output value.

In an embodiment, as each of a plurality of pixels included in the pixel array 110 operates in a plurality of modes, the signal processor 190 may receive pixel values pdt of each of a plurality of modes from the data bus 132 and merge the received pixel values pdt to generate an image having a high dynamic range. The signal processor 190 may determine whether each pixel value pdt corresponding to a plurality of modes is a black spot generation value, perform correction, and merge the pixel values pdt. According to embodiments, the signal processor 190 may be provided in an external processor of the image sensor 100.

Figure 2A:
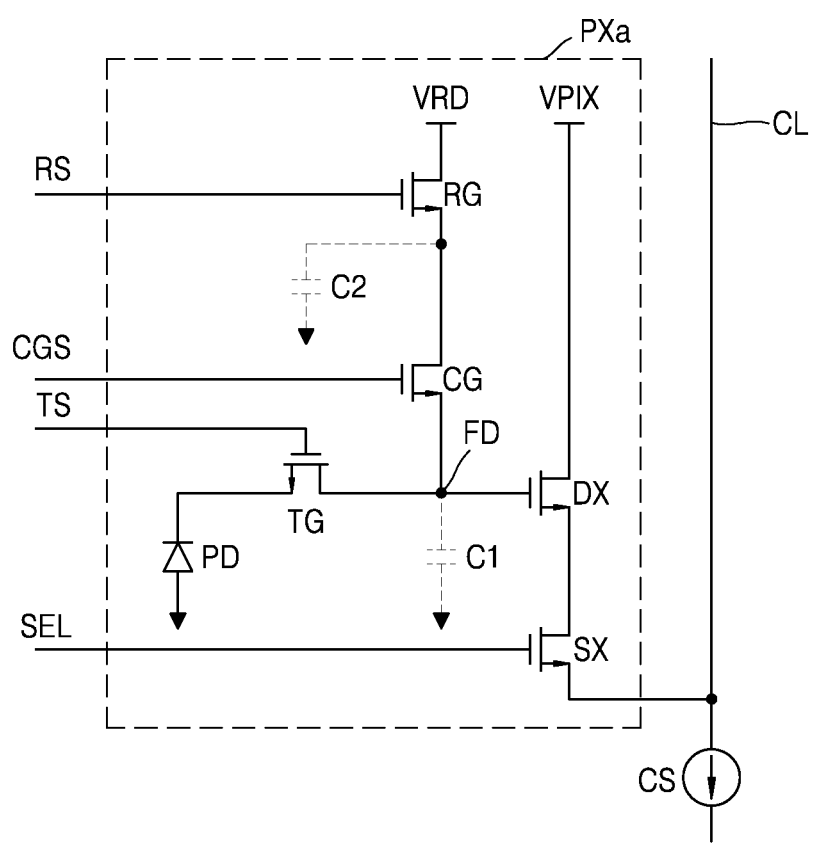
FIG. 2A is a circuit diagram illustrating an example of a pixel according to embodiments of the present disclosure.
Figure 2B:
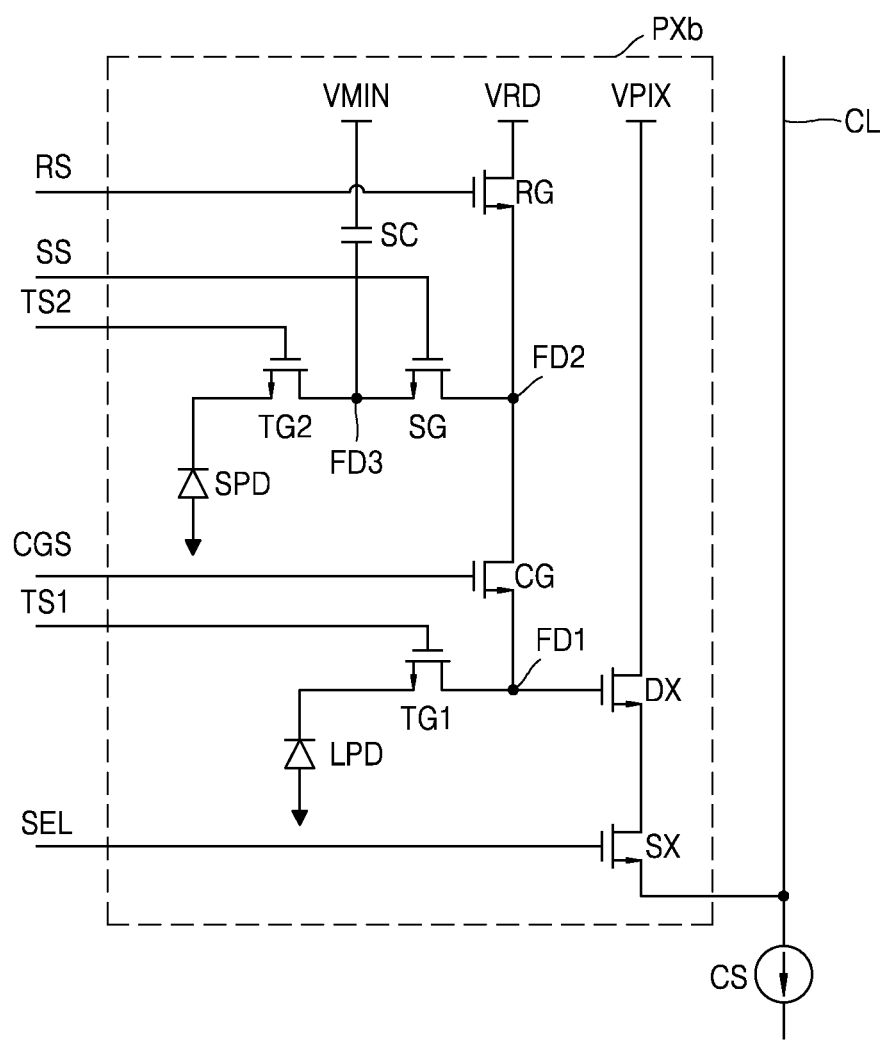
FIG. 2B is a circuit diagram illustrating an example of a pixel according to embodiments of the present disclosure.

FIGS. 2A and 2B are circuit diagrams illustrating examples of a pixel according to embodiments. In some embodiments, each of the pixels PXa and PXb of FIGS. 2A and 2B may be included in the pixel array 110 of FIG. 1. The pixels included in the pixel array 110 of FIG. 1 are not limited to the pixels PXa and PXb of FIGS. 2A and 2B. Since the pixels PXa and PXb correspond to the pixel PX of FIG. 1, a repeated description of overlapping content may be omitted.

Referring to FIG. 2A, the pixel PXa may include a photodiode PD, a first capacitor C1, a second capacitor C2, and a plurality of transistors. The plurality of transistors may include a transmission transistor TG, a reset transistor RG, a gain control transistor CG, a driving transistor DX, and a selection transistor SX. In some embodiments, the first capacitor C1 may correspond to a parasitic capacitor of a floating diffusion node FD. In some embodiments, the second capacitor C2 may be a passive element structured to have a fixed or variable capacitance. In some embodiments, the second capacitor C2 may correspond to a parasitic capacitor of a node connected to the source of the reset transistor RG and the drain of the gain control transistor CG.

The photodiode PD is a photoelectric conversion element that may convert light incident from outside of the photodiode PD into an electrical signal. The photodiode PD may accumulate charges according to the intensity of light. The pixel PXa may receive driving signals provided from the row driver 120 of FIG. 1, that is, a reset signal RS, a gain signal CGS, a transmission signal TS, and a selection signal SEL.

The reset transistor RG may be turned on in response to the activated reset signal RS, and the gain control transistor CG may be turned on in response to the activated gain signal CGS. Accordingly, a reset voltage VRD may be applied to the floating diffusion node FD, and the floating diffusion node FD may be reset. The transmission transistor TG may be turned on in response to the activated transmission signal TS, and accordingly, the photodiode PD may also be reset.

The transmission transistor TG may be turned off in response to the inactive transmission signal TS, and while the transmission transistor TG is turned off, that is, during the exposure time, the photodiode PD may accumulate charges according to incident light. When the transmission transistor TG is turned on in response to the activated transmission signal TS, charges accumulated in the photodiode PD may be transferred to the floating diffusion node FD. When the gain signal CGS is deactivated, charges may be accumulated in the first capacitor C1, and when the gain signal CGS is activated, charges may be accumulated in the first capacitor C1 and the second capacitor C2.

In the pixel PXa, the charge generated by the photodiode PD may be accumulated in the floating diffusion node FD, and the charge accumulated in the floating diffusion node FD may be converted into a voltage. In this case, a rate at which charges accumulated in the floating diffusion node FD are converted into voltage may be referred to as a conversion gain. The voltage of the floating diffusion node FD corresponding to the same amount of charge may be different depending on whether the gain signal CGS is activated, and the conversion gain may vary according to the gain signal CGS. That is, when the gain signal CGS is inactivated, the pixel PXa may have a high conversion gain (HCG), and when the gain signal CGS is activated, the pixel PXa may have a low conversion gain (LCG). As such, a pixel PXa providing two different conversion gains may be referred to as a dual conversion gain (DCG) pixel. In this specification, an operation mode used to generate a pixel signal using a high conversion gain HCG is referred to as a high conversion gain HCG mode, and an operation mode used to generate a pixel signal using a low conversion gain LCG is referred to as a low conversion gain LCG mode.

The pixel PXa may generate pixel signals in a dual conversion gain mode. For example, the photodiode PD may operate in a high conversion gain HCG mode to generate a first pixel signal, and operate in a low conversion gain LCG mode to generate a second pixel signal. In an embodiment, the first pixel signal and the second pixel signal may be generated within one frame section in which a pixel array (e.g., the pixel array 110 of FIG. 1) is scanned. However, the inventive concept is not necessarily limited thereto. For example, according to embodiments, each of the first pixel signal and the second pixel signal may be generated in different frame sections.

The driving transistor DX may function as a source follower by means of current source CS connected to a pixel voltage VPIX and the column line CL, and transfer the voltage of the floating diffusion node FD to the selection transistor SX. In some embodiments, the current source CS may be shared by pixels connected to the column line CL and may be included in the readout circuit 130 of FIG. 1.

The selection transistor SX may provide the output voltage of the driving transistor DX to the column line CL in response to the activated selection signal SEL. The voltage of the column line CL may be provided to the readout circuit 130 of FIG. 1 as a pixel signal.

Referring to FIG. 2B, the pixel PXb may include a large photodiode LPD, a small photodiode SPD, a capacitor SC, and a plurality of transistors. The plurality of transistors may include a first transmission transistor TG1, a second transmission transistor TG2, a switch transistor SG, a reset transistor RG, a gain control transistor CG, a driving transistor DX, and a selection transistor SX. Each of first to third floating diffusion nodes FD1 to FD3 may have a parasitic capacitance. In some embodiments, the pixel PXb may further include capacitors as passive elements respectively connected to the first to third floating diffusion nodes FD1 to FD3.

The large photodiode LPD and the small photodiode SPD may accumulate charges according to incident light. The large photodiode LPD may have a larger light-receiving area than the small photodiode SPD. A pixel structure including photodiodes of different sizes, such as the pixel PXb, may be referred to as a split photodiode (split PD). However, the present disclosure is not limited thereto, and the above structure may be referred to by other names.

Since the light-receiving area of the large photodiode LPD is wide, more charges may be generated than the small photodiode SPD under the same light-receiving conditions. That is, the large photodiode LPD may have a higher sensitivity than the small photodiode SPD. However, the present disclosure is not limited thereto. For example, according to embodiments, the pixel PXb may include a plurality of photodiodes having the same or different light-receiving areas.

Each of the pixels PXb may receive driving signals provided from the row driver 120 of FIG. 1, that is, a reset signal RS, a gain signal CGS, a first transmission signal TS1, a second transmission signal TS2, a switch signal SS, and a selection signal SEL. The pixel PXb may support a high conversion gain HCG mode and a low conversion gain LCG mode of the large photodiode LPD, and support a high conversion gain HCG mode and a low conversion gain LCG mode of the small photodiode SPD. Accordingly, the pixel PXb may provide a wider dynamic range than the pixel PXa of FIG. 2A.

The reset transistor RG may be turned on in response to the activated reset signal RS, and thus, the second floating diffusion node FD2 may be reset. The gain control transistor CG may be turned on in response to the activated gain signal CGS, and accordingly, the first floating diffusion node FD1 may be reset. A first reset signal corresponding to the reset first floating diffusion node FD1 may be read out through the column line CL.

In the high conversion gain HCG mode of the large photodiode LPD, the gain signal CGS may be inactivated, and thus, the gain control transistor CG may be turned off. When the first transmission transistor TG1 is turned on in response to the activated first transmission signal TS1, charges accumulated in the large photodiode LPD may be transferred to the first floating diffusion node FD1. In this case, the first image signal corresponding to the first floating diffusion node FD1 may be read out through the column line CL. A first pixel signal corresponding to a high conversion gain HCG mode of the large photodiode LPD may be obtained based on a difference between the first image signal and the first reset signal.

In the low conversion gain LCG mode of the large photodiode LPD, the gain signal CGS may be activated, and thus, the gain control transistor CG may be turned on. When the first transmission transistor TG1 is turned on in response to the activated first transmission signal TS1, charges accumulated in the large photodiode LPD may be transferred to the first floating diffusion node FD1 and the second floating diffusion node FD2. Second image signals corresponding to the first floating diffusion node FD1 and the second floating diffusion node FD2 may be read out through the column line CL. In a state in which the gain control transistor CG is turned on, the reset signal RS may be activated and the reset transistor RG may be turned on. The first floating diffusion node FD1 and the second floating diffusion node FD2 may be reset. A second reset signal corresponding to the reset first floating diffusion node FD1 and the second floating diffusion node FD2 may be read out through the column line CL. A second pixel signal corresponding to a low conversion gain LCG mode of the large photodiode LPD may be obtained based on a difference between the second image signal and the second reset signal.

After the readout operation of the high conversion gain HCG mode and the low conversion gain LCG mode of the large photodiode LPD, for a readout operation of the small photodiode SPD, in a state in which the gain control transistor CG is turned on, the reset signal RS may be activated and the reset transistor RG may be turned on. The first floating diffusion node FD1 and the second floating diffusion node FD2 may be reset. For the high conversion gain HCG mode of the small photodiode SPD, the switch signal SS may be activated, and accordingly, the switch transistor SG may be turned on. At this time, a third reset signal corresponding to the charge accumulated in the capacitor SC may be output through the column line CL. When the second transmission transistor TG is turned on in response to the activated second transmission signal TS2, charges accumulated in the small photodiode SPD are transferred to the third floating diffusion node FD3 connected to the capacitor SC, and a third image signal may be read out. A third pixel signal corresponding to a high conversion gain HCG mode of the small photodiode SPD may be obtained based on a difference between the third image signal and the third reset signal.

As shown in FIG. 2B, the capacitor SC may be connected between the node to which a voltage VMIN is applied and the third floating diffusion node FD3. In the low conversion gain LCG mode of the small photodiode SPD, the switch signal SS may be activated, and accordingly, the switch transistor SG may be turned on. When the second transmission transistor TG is turned on in response to the activated second transmission signal TS2, charges accumulated in the small photodiode SPD are transferred to the third floating diffusion node FD3 and the second floating diffusion node FD2, and the fourth image signal may be read out. Then, the reset signal RS may be activated, and the reset transistor RG may be turned on. Accordingly, the second floating diffusion node FD2 and the third floating diffusion node FD3 may be reset. A fourth reset signal corresponding to the reset floating diffusion nodes FD2 and FD3 may be output through the column line CL. A fourth pixel signal corresponding to a low conversion gain LCG mode of the small photodiode SPD may be obtained based on a difference between the fourth image signal and the fourth reset signal.

The pixel PXb may operate in a plurality of modes. In an embodiment, the pixel PXb may operate in multiple modes based on at least one photoelectric conversion element and a conversion gain. The pixel PXb may be set to different modes under the control of the row driver 120 and may generate pixel signals corresponding to the different modes, respectively. The large photodiode LPD may operate in a high conversion gain HCG mode to generate a first pixel signal, and operate in a low conversion gain LCG mode to generate a second pixel signal. The small photodiode SPD may operate in a high conversion gain HCG mode to generate a third pixel signal, and operate in a low conversion gain LCG mode to generate a fourth pixel signal. For example, the first to fourth pixel signals may be generated within one frame section in which a pixel array (e.g., the pixel array 110 of FIG. 1) is scanned. As another example, the first to fourth pixel signals may be generated within a frame section corresponding to each of the first to fourth pixel signals.

Figure 3:
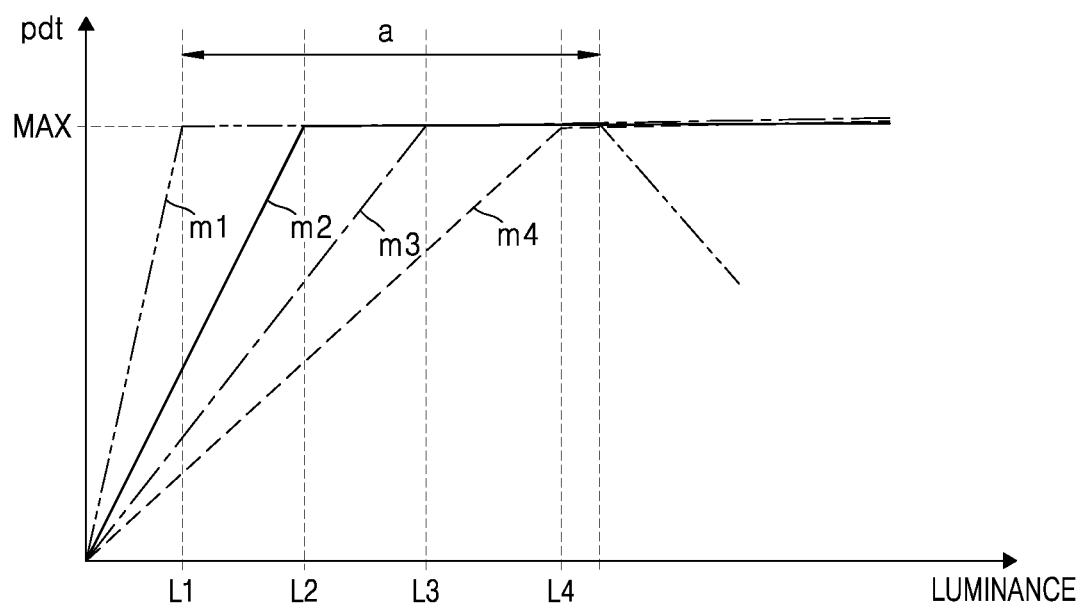
FIG. 3 is a diagram illustrating an output gain according to an embodiment of the present disclosure.

FIG. 3 is a diagram illustrating an output gain according to an embodiment of the present disclosure. Referring to FIG. 3, a horizontal axis of the graph of FIG. 3 refers to luminance, and a vertical axis refers to a pixel value pdt. For convenience of explanation, a further description of components and technical aspects previously described with reference to FIGS. 1, 2A, and 2B may be omitted.

A pixel may operate in a plurality of modes. For example, the pixels may operate in the first to fourth modes. As an example, the pixel may operate in a first mode, which is a high conversion gain HCG mode of a large photodiode (e.g., the large photodiode LPD of FIG. 2B), and operate in a second mode, which is a low conversion gain LCG mode of the large photodiode LPD. The pixel may operate in a third mode, which is a high conversion gain HCG mode of a small photodiode (e.g., the small photodiode SPD of FIG. 2B), and operate in a fourth mode, which is a low conversion gain LCG mode of the small photodiode SPD. Hereinafter, for convenience of description, it is assumed that the pixels operate in four modes. However, the inventive concept is not limited thereto.

A pixel may operate in a first mode in which a first pixel signal is generated. The first pixel signal may include a first reset signal and a first image signal. A first pixel value may be generated based on the first reset signal and the first image signal. A pixel value corresponding to the first mode may be a first pixel value of the first mode. The pixels may operate in a second mode in which a second pixel signal is generated. A second pixel value may be generated based on the second pixel signal. A pixel value corresponding to the second mode may be a second pixel value of the second mode. The pixels may operate in a third mode in which a third pixel signal is generated. A third pixel value may be generated based on the third pixel signal. A pixel value corresponding to the third mode may be a third pixel value of the third mode. The pixels may operate in a fourth mode in which a fourth pixel signal is generated. A fourth pixel value may be generated based on the fourth pixel signal. A pixel value corresponding to the fourth mode may be a fourth pixel value of the fourth mode.

The first mode, the second mode, the third mode, and the fourth mode may be modes having a large output gain, in which the output gain decreases in the order listed. That is, the first mode may be a mode having the largest output gain among the plurality of operation modes of the pixel, the second mode may be a mode having a smaller output gain than the first mode, the third mode may be a mode having a smaller output gain than the second mode, and the fourth mode may be a mode having the smallest output gain among the plurality of operation modes of the pixel.

Referring to FIG. 3, graphs may be different according to operation modes of pixels. A first graph m1 is a graph showing a first pixel value according to luminance when a pixel operates in a first mode. A second graph m2 is a graph showing a second pixel value according to luminance when the pixel operates in the second mode. A third graph m3 is a graph showing a third pixel value according to luminance when the pixel operates in the third mode. A fourth graph m4 is a graph showing a fourth pixel value according to luminance when the pixel operates in the fourth mode.

In each mode, the luminance at which the pixel value pdt is saturated may be different. Referring to the first graph m1, when the pixel operates in the first mode, a first pixel value may be saturated from the first luminance L1. The first mode may have the largest output gain among the first to fourth modes. Since the first pixel value is saturated with the maximum output value MAX at the first luminance L1 lower than the second luminance L2, the third luminance L3, and the fourth luminance L4, the output gain of the first mode may be the largest. The first graph m1 may maintain the maximum output value MAX from the first luminance L1 to the luminance section a.

Referring to the second graph m2, when a pixel operates in the second mode, a second pixel value may be saturated from the second luminance L2. The second mode may have a higher output gain next to the first mode. Since the second pixel value is saturated with the maximum output value (MAX) at the second luminance L2 lower than the third luminance L3 and the fourth luminance L4, an output gain of the second mode may be smaller than that of the first mode and larger than those of the third and fourth modes. The second graph m2 may maintain the maximum output value MAX for a preset luminance section starting from the second luminance L2.

Referring to the third graph m3, when the pixel operates in the third mode, a third pixel value from the third luminance L3 may be saturated. The third mode may have a larger output gain next to the second mode. Since the third pixel value is saturated with the maximum output value MAX at the third luminance L3 lower than the fourth luminance L4, an output gain of the third mode may be smaller than that of the second mode and larger than that of the fourth mode. The third graph m3 may maintain the maximum output value MAX for a certain luminance section starting from the third luminance L3.

Referring to the fourth graph m4, when a pixel operates in the fourth mode, a fourth pixel value from the fourth luminance L4 may be saturated. The fourth mode may have the smallest output gain among the first to fourth modes. The fourth graph m4 may maintain the maximum output value MAX for a certain luminance section starting from the fourth luminance L4.

A maximum output value MAX may be output as a pixel value during a certain luminance section, and then a pixel value with a value lower than the maximum output value MAX may be output at a certain luminance or more. At high luminance, when the charge overflows from the photoelectric conversion element of the pixel, the difference between the reset signal and the image signal is reduced, and the pixel value may decrease. That is, if a pixel value decreases beyond a certain luminance after the pixel value is saturated, a black spot may appear.

Since a mode with a large output gain may be saturated at low luminance, the luminance at which a black spot occurs may also be low. In the first graph m1, the value of the first pixel value after the luminance section a from the first luminance L1 may be lower than the maximum output value MAX. Since the first mode has a large output gain, a black spot may occur at a luminance lower than that of the second to fourth modes. When the first pixel value is lower than the maximum output value MAX, at least one of the second pixel value, the third pixel value, and the fourth pixel value at the corresponding luminance may be greater than the first pixel value. When the first pixel value is lower than the maximum output value MAX, a black spot may appear. A black spot may appear when the first pixel value is smaller than at least one of the second pixel value, the third pixel value, and the fourth pixel value of the corresponding luminance.

An image sensor according to an embodiment of the present disclosure may determine whether a target pixel value is a black spot generation value based on at least one of the comparison pixel values of the mode whose output gain is smaller than the mode of the target pixel value. When the first pixel value is the target pixel value, the second pixel value, the third pixel value, and the fourth pixel value may be comparison pixel values. The image sensor may determine whether the target pixel value is a black spot generation value based on at least one of the second pixel value, the third pixel value, and the fourth pixel value. This is described in further detail below with reference to FIG. 4.

Figure 4:
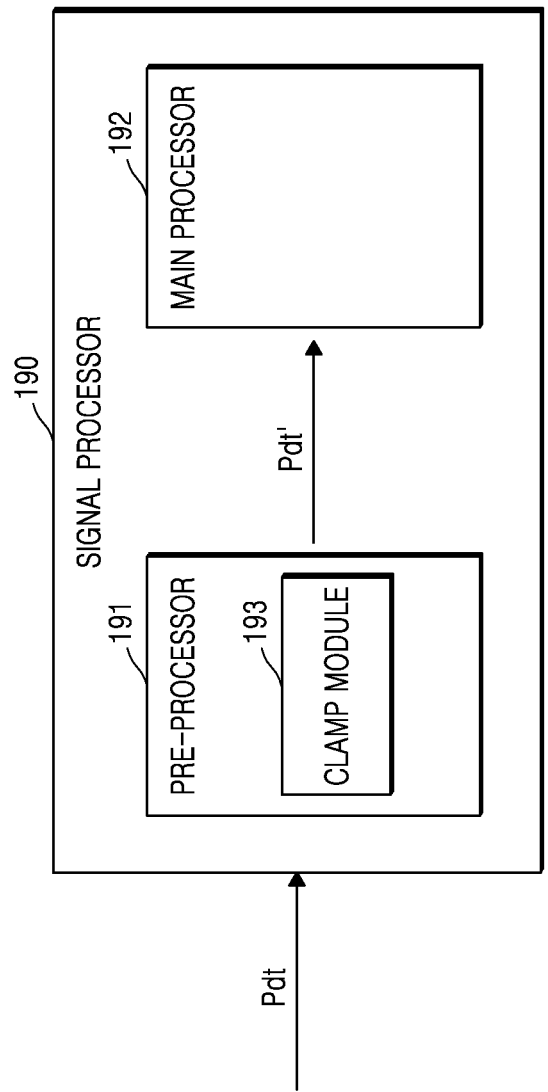
FIG. 4 is a block diagram illustrating a signal processor according to an embodiment of the present disclosure.

FIG. 4 is a block diagram illustrating a signal processor according to an embodiment of the present disclosure. Since the signal processor 190 of FIG. 4 corresponds to the signal processor 190 of FIG. 1, for convenience of explanation, a further description of components and technical aspects previously described may be omitted.

Referring to FIG. 4, the signal processor 190 may include a pre-processor 191 and a main processor 192. The signal processor 190 may further include other components. The pre-processor 191 and the main processor 192 may be implemented as a single semiconductor chip or a plurality of semiconductor chips. In FIG. 4, the pre-processor 191 and the main processor 192 are disclosed as separate components. However, this is merely an example, and the inventive concept is not limited thereto. For example, according to embodiments, the pre-processor 191 and the main processor 192 may be implemented as a single component.

The signal processor 190 may receive the pixel value pdt from the readout circuit (e.g., the readout circuit 130 of FIG. 1). The pre-processor 191 may pre-process the pixel value pdt. The pre-processor 191 may process the pixel value pdt into a form in which the main processor 192 may process images. The pre-processor 191 may include a clamp module 193.

The clamp module 193 may determine whether the pixel value pdt is a black spot generation value. The clamp module 193 may receive a pixel value pdt corresponding to each of a plurality of modes from the readout circuit 130. The clamp module 193 may determine whether the target pixel value is a black spot generation value.

The clamp module 193 may determine whether the target pixel value is a black spot generation value based on at least one of the comparison pixel values. For example, the clamp module 193 may determine whether the target pixel value is a black spot generation value based on one of the comparison pixel values, and determine whether the target pixel value is a black spot generation value based on two of the comparison pixel values. However, the inventive concept is not necessarily limited thereto. For example, according to embodiments, the clamp module 193 may determine whether the target pixel value is a black spot generation value based on all comparison pixel values.

The target pixel value may mean a value used to determine whether the value is a black spot generation value among pixel values corresponding to a plurality of modes. The comparison pixel value may refer to a pixel value of a mode having a smaller output gain than the target mode corresponding to the target pixel value. In an embodiment, the target pixel value may include a pixel value other than a mode having the smallest output gain among pixel values of each of a plurality of modes. For example, the clamp module 193 may determine whether pixel values of the first to third modes among the first to fourth modes are black spot generation values.

In an embodiment, the clamp module 193 may determine the target pixel value as a black spot generation value when the target pixel value is smaller than at least one of the comparison pixel values. For example, when the first pixel value is the target pixel value and the first pixel value is smaller than the second pixel value, the clamp module 193 may determine the first pixel value as a black spot generation value.

The clamp module 193 may determine whether a target pixel value is a black spot generation value based on a comparison pixel value of a mode having the smallest output gain among comparison pixel values. Pixel values of the mode with the smallest output gain may be saturated at high luminance. Even if the pixel value of the mode with the smallest output gain is not saturated in the same luminance, the target pixel value may be saturated. The clamp module 193 may determine the target pixel value as a black spot generation value if the comparison pixel value of the mode with the smallest output gain is equal to or greater than a preset value. The preset value may be a comparison pixel value of a mode having the smallest output gain at a luminance at which the target pixel value starts to be saturated. This will be described below in detail with reference to FIG. 7.

The clamp module 193 may correct the target pixel value when determining the target pixel value as a black spot generation value. The clamp module 193 may correct the target pixel value to a maximum output value when the target pixel value is the black spot generation value. The maximum output value may refer to a pixel value pdt saturated in each of a plurality of modes of a pixel. Pixel values pdt saturated in each of the plurality of modes may be the same. For example, when the first pixel value is the black spot generation value, the clamp module 193 may correct the value of the first pixel value to a maximum output value. The pre-processor 191 may output the pixel value pdt processed through the pre-processor 191 and the clamp module 193 as the pre-processed pixel value pdt'.

The main processor 192 may receive the pre-processed pixel value pdt' from the pre-processor 191. The main processor 192 may perform image processing on the pre-processed pixel value pdt', which may result in increased image quality. The main processor 192 may perform, for example, noise reduction processing, gain adjustment, waveform shaping processing, interpolation processing, white balance processing, gamma processing, edge enhancement processing, binning, and the like on the preprocessed pixel value pdt'.

An image sensor according to an embodiment of the present disclosure may determine whether a target pixel value is a black spot generation value by using a pixel value of a mode according to an output gain, and correct the pixel value. By correcting the pixel value, black spots are removed from the image generated by the image sensor, and the quality of the image may be increased. In addition, according to an embodiment, since an analog circuit that removes a black spot is not included, the cost for designing an analog circuit may be reduced and the degree of freedom in design may be increased. Thus, according to an embodiment, the level of an output pixel signal may not be limited, and a signal to noise ratio (SNR) may be improved.

Figure 5:
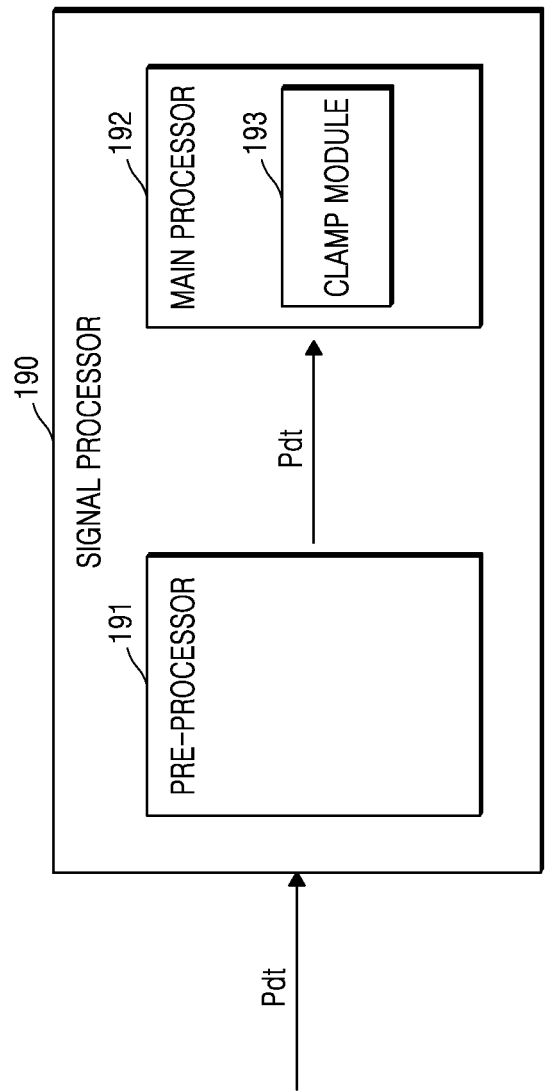
FIG. 5 is a diagram illustrating a signal processor according to an embodiment of the present disclosure.

FIG. 5 is a diagram illustrating a signal processor according to an embodiment of the present disclosure. Compared to FIG. 4, the clamp module 193 may be included in the main processor 192 instead of in the pre-processor 191. Since the signal processor 190, the pre-processor 191, the main processor 192, and the clamp module 193 in FIG. 5 correspond to the signal processor 190, the pre-processor 191, the main processor 192, and the clamp module 193 of FIG. 4, a description of overlapping content may be omitted.

Referring to FIG. 5, the signal processor 190 may include a pre-processor 191 and a main processor 192. The signal processor 190 may receive the pixel value pdt from the readout circuit (e.g., the readout circuit 130 of FIG. 1). The pre-processor 191 may pre-process the pixel value pdt. The pre-processor 191 may process the pixel value pdt into a form in which the main processor 192 may process images.

The main processor 192 may include a clamp module 193. The main processor 192 may receive the pixel value pdt from the pre-processor 191. The clamp module 193 may determine whether the pixel value pdt is a black spot generation value. The clamp module 193 may determine whether the target pixel value is a black spot generation value.

The clamp module 193 may determine whether the target pixel value is a black spot generation value based on at least one of the comparison pixel values. In an embodiment, the clamp module 193 may determine the target pixel value as a black spot generation value when the target pixel value is smaller than at least one of the comparison pixel values.

The clamp module 193 may correct the target pixel value when determining the target pixel value as a black spot generation value. The clamp module 193 may correct the target pixel value to a maximum output value when the target pixel value is the black spot generation value.

The main processor 192 may perform image processing on the pixel value pdt, which may increase image quality. The main processor 192 may perform, for example, noise reduction processing, gain adjustment, waveform shaping processing, interpolation processing, white balance processing, gamma processing, edge enhancement processing, binning, and the like on the pixel value pdt.

Figure 6:
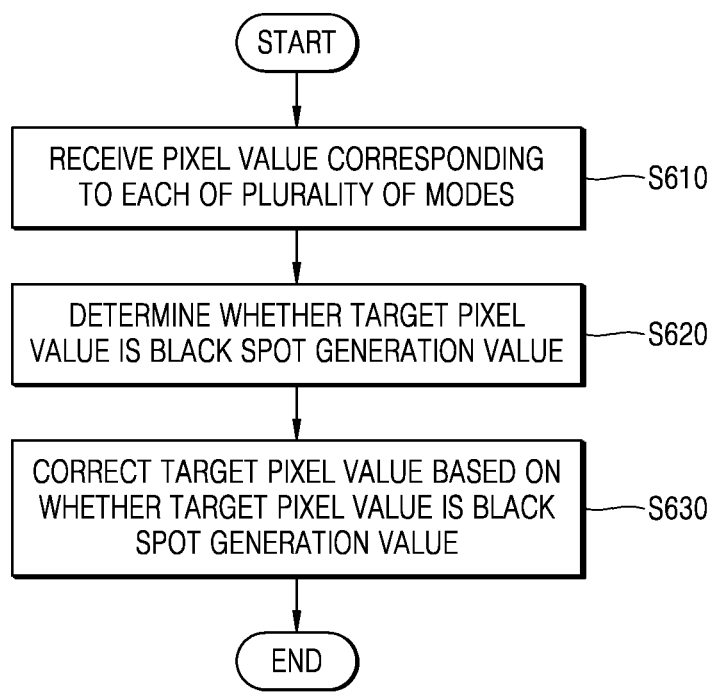
FIG. 6 is a flowchart illustrating a method of operating an image sensor according to an embodiment of the present disclosure.

FIG. 6 is a flowchart illustrating a method of operating an image sensor according to an embodiment of the present disclosure. For example, the operation method of FIG. 6 may be performed by the signal processor 190 of FIG. 1.

In operation S610, the signal processor may receive a pixel value corresponding to each of a plurality of modes. A pixel (e.g., the pixel PX of FIG. 1) may operate in a plurality of modes based on at least one photoelectric conversion element and a conversion gain. A pixel may generate a pixel signal corresponding to each of a plurality of modes. A readout circuit (e.g., the readout circuit 130 of FIG. 1) may generate a pixel value by converting a pixel signal into a digital signal. The signal processor may receive a pixel value corresponding to each of a plurality of modes from the readout circuit.

In operation S620, the signal processor may determine whether the target pixel value is a black spot generation value. The black spot generation value may refer to a value that generates a black spot in an image generated by a signal processor. At high luminance, an overflow of charge from the photoelectric conversion element may generate a pixel signal with a reduced difference between the reset signal and the image signal. When an image is generated based on the pixel signal in which the difference between the reset signal and the image signal is reduced, a black spot, which is a phenomenon in which black appears in the image, may occur. The target pixel value may mean a value used to determine whether the target pixel value is a black spot generation value among pixel values corresponding to a plurality of modes.

The signal processor may determine whether the target pixel value is a black spot generation value based on at least one of comparison pixel values of a comparison mode having a smaller output gain than that of the target mode. The comparison pixel value may refer to a pixel value of a comparison mode having a smaller output gain than a target mode corresponding to a target pixel value among a plurality of modes. The output gain refers to a pixel value according to the luminance, and the luminance at which the value of the pixel value is saturated may be different according to the mode of the pixel.

When the target pixel value is smaller than at least one of the comparison pixel values, the signal processor may determine the target pixel value as a black spot generation value. As an example, when the target pixel value is smaller than one of the comparison pixel values, the signal processor may determine the target pixel value as the black spot generation value. As another example, the signal processor may determine the target pixel value as a black spot generation value when the target pixel value is smaller than all comparison pixel values. However, the inventive concept is not necessarily limited to the listed examples.

In an embodiment, the signal processor may determine whether a target pixel value is a black spot generation value based on a comparison pixel value of a mode having the smallest output gain among comparison pixel values. The signal processor may determine the target pixel value as a black spot generation value if the comparison pixel value of the mode with the smallest output gain is equal to or greater than a preset value.

For example, it is assumed that the target pixel value is the first pixel value and the comparison pixel value of the mode with the smallest output gain is the fourth pixel value. The signal processor may determine the first pixel value as a black spot generation value when the fourth pixel value is greater than or equal to a preset value.

In an embodiment, the signal processor may perform the operations of determining whether the comparison pixel value of the mode with the smallest output gain among the comparison pixel values is equal to or greater than a preset value, and determining whether the target pixel value corresponds to the maximum output value. The signal processor may determine the target pixel value as a black spot generation value when the comparison pixel value of the mode with the smallest output gain is equal to or greater than a preset value and the target pixel value is not the maximum output value. The maximum output value may refer to a pixel value pdt saturated in each of a plurality of modes of a pixel.

In operation S630, the signal processor may correct the target pixel value based on whether the target pixel value is a black spot generation value. The signal processor may correct the target pixel value when determining the target pixel value as the black spot generation value. When the target pixel value is the black spot generation value, the signal processor may correct the target pixel value to a maximum output value. For example, the signal processor may read the maximum output value stored in the memory of the image sensor and correct the value of the target pixel value to the maximum output value.

Figure 7A:
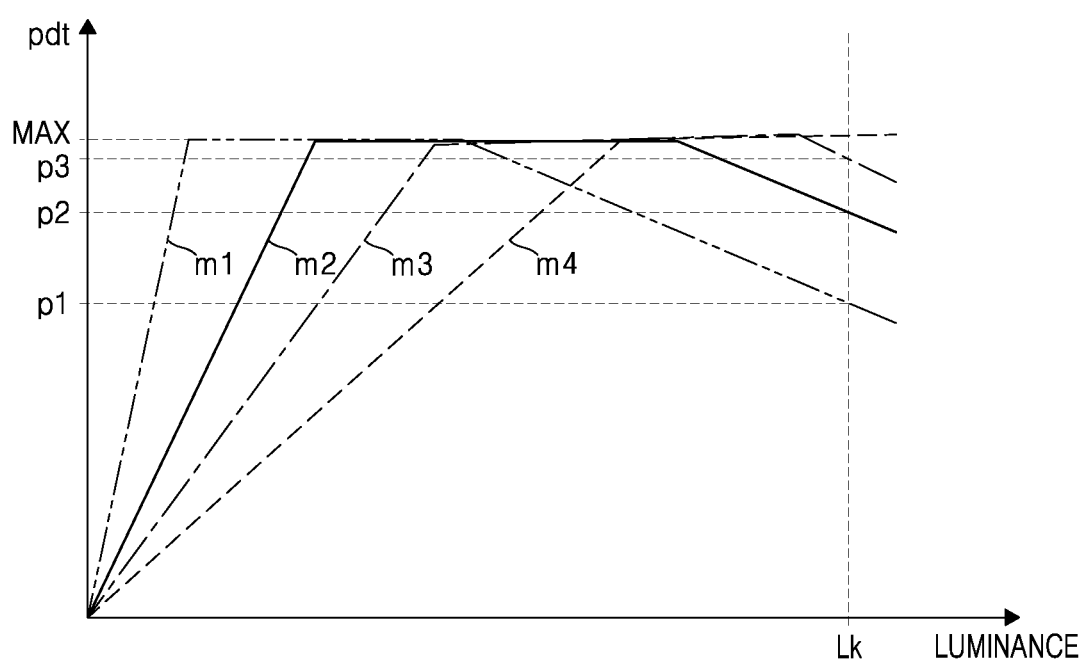
FIG. 7A is a diagram illustrating an operation pixel value of a signal processor according to an embodiment of the present disclosure.

FIG. 7A is a diagram illustrating pixel values according to an embodiment of the present disclosure. A horizontal axis of the graph of FIG. 7A refers to luminance, and a vertical axis refers to a pixel value pdt. For convenience of explanation, a further description of components and technical aspects previously described with reference to FIGS. 1 to 6 may be omitted.

Referring to FIG. 7A, graphs may be different according to operation modes of pixels. A first graph m1 is a graph showing a first pixel value according to luminance when a pixel operates in a first mode. A second graph m2 is a graph showing a second pixel value according to luminance when the pixel operates in the second mode. A third graph m3 is a graph showing a third pixel value according to luminance when the pixel operates in the third mode. A fourth graph m4 is a graph showing a fourth pixel value according to luminance when the pixel operates in the fourth mode. Hereinafter, for convenience of description, it is assumed that the pixels operate in four modes. However, the inventive concept is not limited to four modes.

A maximum output value MAX may be output as a pixel value during a certain luminance section, and then a pixel value with a value lower than the maximum output value MAX may be output at a certain luminance or more. At high luminance, overflow of charge from the photoelectric conversion element of a pixel may reduce pixel values and cause black spots to develop. Since a mode with a large output gain may be saturated at a low luminance, a pixel value of a mode with a large output gain may be smaller at the same luminance. Hereinafter, an operation of the signal processor will be described in detail with reference to FIGS. 7A and 7B.

Figure 7B:
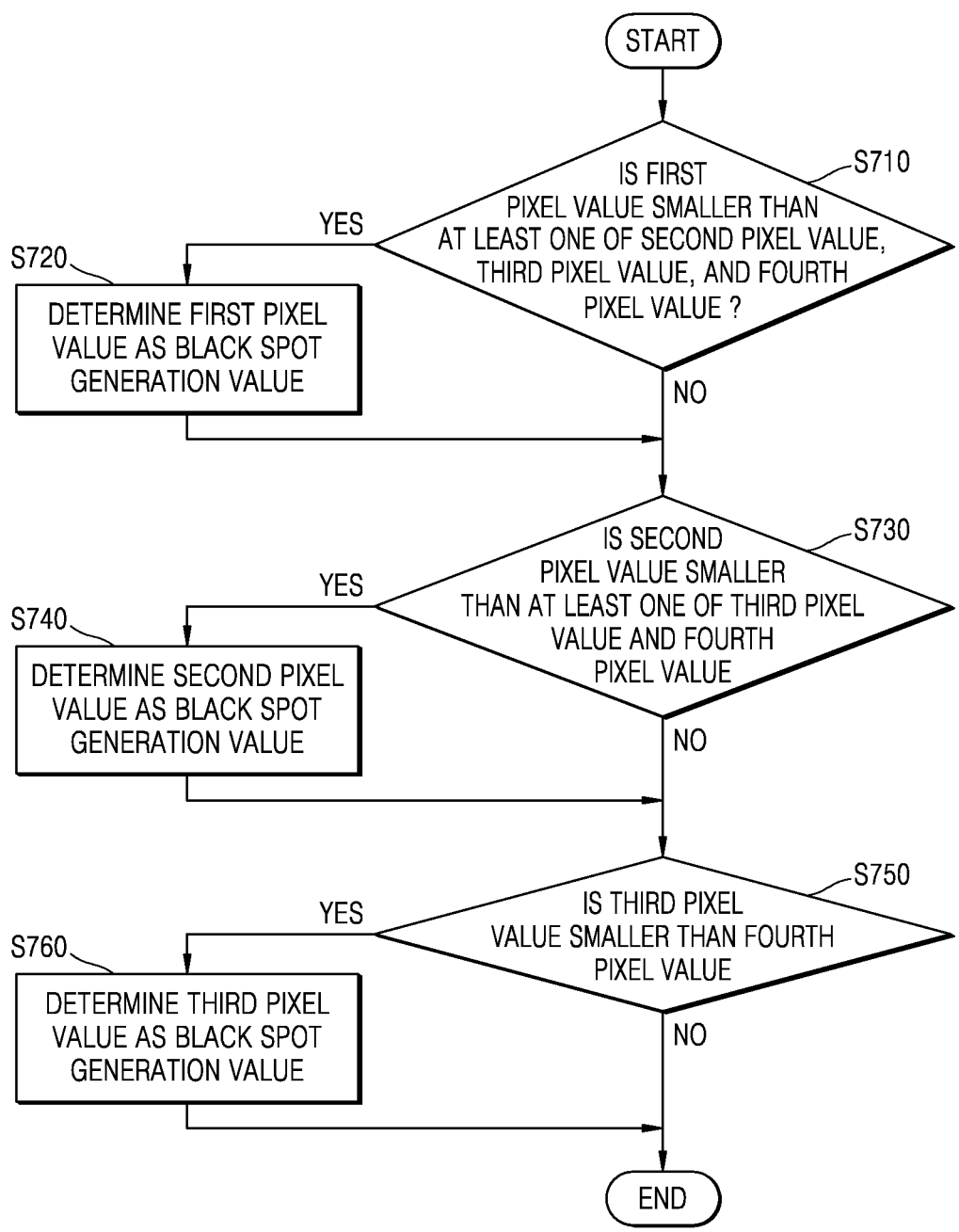
FIG. 7B is a flowchart illustrating the operation of a signal processor according to an embodiment of the present disclosure.

FIG. 7B is a flowchart illustrating the operation of a signal processor according to an embodiment of the present disclosure. For example, the flowchart of FIG. 7B may represent an example of operation S620 of FIG. 6. Hereinafter, FIG. 7A is also referred to.

Referring to FIGS. 7A and 7B, a signal processor (e.g., the signal processor 190 of FIGS. 4 and 5) may determine whether a target pixel value is a black spot generation value based on at least one of comparison pixel values. The signal processor may determine whether the first pixel value is a black spot generation value. When the first pixel value is the target pixel value, the comparison pixel value may be the second pixel value, the third pixel value, and the fourth pixel value. The signal processor may determine whether the first pixel value is a black spot generation value based on at least one of the second pixel value, the third pixel value, and the fourth pixel value.

When the target pixel value is smaller than at least one of the comparison pixel values, the signal processor may determine the target pixel value as a black spot generation value. In operation S710, the signal processor may determine whether the first pixel value is smaller than at least one of the second pixel value, the third pixel value, and the fourth pixel value. In operation S720, the signal processor may determine the first pixel value as a black spot generation value when the first pixel value is smaller than at least one of the comparison pixel values. The signal processor may perform operation S730 when the first pixel value is not smaller than at least one of the comparison pixel values. When the first pixel value is not smaller than at least one of the comparison pixel values, the signal processor may perform operation S730 without determining the first pixel value as a black spot generation value.

In an embodiment, the signal processor may determine the target pixel value as a black spot generation value when the target pixel value is smaller than one of the comparison pixel values. At a k-th luminance Lk, where k is a positive integer, the first pixel value is p1, the second pixel value is p2, the third pixel value is p3, and the fourth pixel value is the maximum output value MAX. At the k-th luminance Lk, since the first pixel value is smaller than the second pixel value, the signal processor may determine the first pixel value as a black spot generation value. Since the first pixel value is smaller than the third pixel value, the signal processor may determine the first pixel value as the black spot generation value. Since the first pixel value is smaller than the fourth pixel value, the signal processor may determine the first pixel value as the black spot generation value.

In an embodiment, the signal processor may determine the target pixel value as a black spot generation value when the target pixel value is smaller than the value of the comparison pixel of the mode having the largest output gain among the comparison modes. When the target pixel value is the first pixel value, the mode having the largest output gain among the comparison modes is the second mode. Since the first pixel value is smaller than the second pixel value at the k-th luminance Lk, the signal processor may determine the first pixel value as a black spot generation value.

In an embodiment, the signal processor may determine the target pixel value as a black spot generation value when at least one of the comparison pixel values is the maximum output value and the target pixel value is smaller than the maximum output value. Since the fourth pixel value is the maximum output value MAX at the k-th luminance Lk, but the first pixel value is not the maximum output value MAX, the signal processor may determine the first pixel value as a black spot generation value.

In an embodiment, the signal processor may determine the target pixel value as a black spot generation value when the target pixel value is smaller than two of the comparison pixel values. As an example, since the first pixel value is smaller than the second pixel value and the third pixel value at the k-th luminance Lk, the signal processor may determine the first pixel value as the black spot generation value. As another example, since the first pixel value is smaller than the second pixel value and the fourth pixel value, the signal processor may determine the first pixel value as the black spot generation value.

In an embodiment, the signal processor may determine the target pixel value as a black spot generation value when the target pixel value is smaller than all comparison pixel values. As an example, since the first pixel value is smaller than the second pixel value, the third pixel value, and the fourth pixel value at the k-th luminance Lk, the signal processor may determine the first pixel value as the black spot generation value.

According to embodiments, the signal processor may correct the first pixel value to the maximum output value MAX after performing operation S720. However, the inventive concept is not necessarily limited thereto. For example, according to embodiments, the first pixel value may be corrected to the maximum output value MAX in operations after operation S760. When determining the first pixel value as the black spot generation value at the k-th luminance Lk, the signal processor may correct the first pixel value to the maximum output value MAX at p1.

The signal processor may determine whether the second pixel value is a black spot generation value. When the second pixel value is the target pixel value, the comparison pixel value may be the third pixel value and the fourth pixel value. The signal processor may determine whether the second pixel value is a black spot generation value based on at least one of the third pixel value and the fourth pixel value.

In operation S730, the signal processor may determine whether the second pixel value is smaller than at least one of the third pixel value and the fourth pixel value. In operation S740, the signal processor may determine the second pixel value as a black spot generation value when the second pixel value is smaller than at least one of the third pixel value and the fourth pixel value. The signal processor may perform operation S750 when the second pixel value is not smaller than at least one of the comparison pixel values. When the second pixel value is not smaller than at least one of the comparison pixel values, the signal processor may perform operation S750 without determining the second pixel value as a black spot generation value.

In an embodiment, the signal processor may determine the target pixel value as a black spot generation value when the target pixel value is smaller than one of the comparison pixel values. Since the second pixel value is smaller than the third pixel value at the k-th luminance Lk, the signal processor may determine the second pixel value as a black spot generation value. Since the second pixel value is smaller than the fourth pixel value, the signal processor may determine the second pixel value as the black spot generation value.

In an embodiment, the signal processor may determine the target pixel value as a black spot generation value when the target pixel value is smaller than the value of the comparison pixel of the mode having the largest output gain among the comparison modes. When the target pixel value is the second pixel value, the mode having the largest output gain among the comparison modes is the third mode. Since the second pixel value is smaller than the third pixel value at the k-th luminance Lk, the signal processor may determine the second pixel value as a black spot generation value.

In an embodiment, the signal processor may determine the target pixel value as a black spot generation value when at least one of the comparison pixel values is the maximum output value and the target pixel value is smaller than the maximum output value. Since the fourth pixel value is the maximum output value MAX at the k-th luminance Lk, but the second pixel value is not the maximum output value MAX, the signal processor may determine the second pixel value as a black spot generation value.

In an embodiment, the signal processor may determine the target pixel value as a black spot generation value when the target pixel value is smaller than all comparison pixel values. As an example, since the second pixel value is smaller than the third pixel value and the fourth pixel value at the k-th luminance Lk, the signal processor may determine the second pixel value as the black spot generation value.

According to embodiments, the signal processor may correct the second pixel value to the maximum output value MAX after performing operation S740. However, the inventive concept is not necessarily limited thereto. For example, according to embodiments, the second pixel value may be corrected to the maximum output value MAX in operations after operation S760. When determining the second pixel value as the black spot generation value, the signal processor may correct the second pixel value to the maximum output value MAX at p2.

The signal processor may determine whether the third pixel value is a black spot generation value. When the third pixel value is the target pixel value, the comparison pixel value may be the fourth pixel value. The signal processor may determine whether the third pixel value is a black spot generation value based on the fourth pixel value.

In operation S750, the signal processor may determine whether the third pixel value is smaller than the fourth pixel value. In operation S760, the signal processor may determine the third pixel value as a black spot generation value when the third pixel value is smaller than the fourth pixel value.

In an embodiment, the signal processor may determine the target pixel value as a black spot generation value when the target pixel value is smaller than the comparison pixel value. Since the third pixel value is smaller than the fourth pixel value at the k-th luminance Lk, the signal processor may determine the third pixel value as a black spot generation value.

According to embodiments, the signal processor may correct the first pixel value to the maximum output value MAX after performing operation S760. When determining the third pixel value as the black spot generation value, the signal processor may correct the third pixel value to the maximum output value MAX at p3. In addition, although FIG. 7B shows that the first pixel value, the second pixel value, and the third pixel value are determined in the order in which they are listed, the inventive concept is not necessarily limited thereto, and the order may be changed according to embodiments.

Figure 8A:
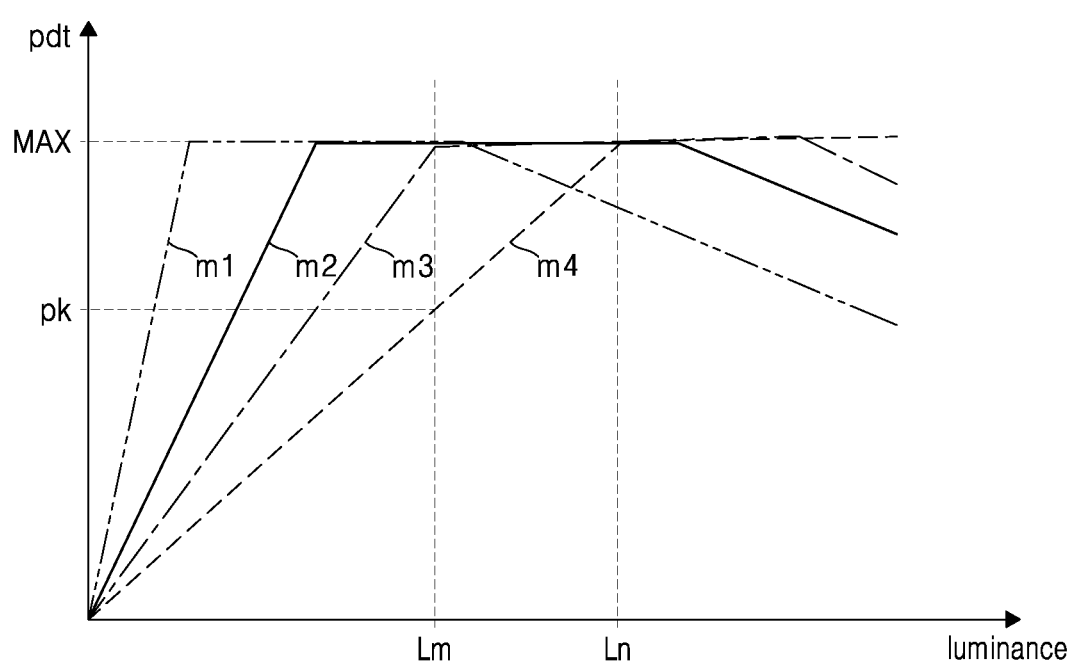
FIG. 8A is a diagram illustrating pixel values according to an embodiment of the present disclosure.

FIG. 8A is a diagram illustrating pixel values according to an embodiment of the present disclosure. The horizontal axis of the graph of FIG. 8A refers to luminance, and the vertical axis refers to pixel values pdt. For convenience of explanation, a further description of components and technical aspects previously described may be omitted.

Referring to FIG. 8A, graphs may be different according to operation modes of pixels. A first graph m1 is a graph showing a first pixel value according to luminance when a pixel operates in a first mode. A second graph m2 is a graph showing a second pixel value according to luminance when the pixel operates in the second mode. A third graph m3 is a graph showing a third pixel value according to luminance when the pixel operates in the third mode. A fourth graph m4 is a graph showing a fourth pixel value according to luminance when the pixel operates in the fourth mode. Hereinafter, for convenience of description, it is assumed that the pixels operate in four modes. However, the inventive concept is not limited thereto.

A maximum output value MAX may be output as a pixel value during a certain luminance section, and then a pixel value with a value lower than the maximum output value MAX may be output at a certain luminance or more. At high luminance, overflow of charge from the photoelectric conversion element of a pixel may reduce pixel values and cause black spots to develop. Since a mode with a large output gain may be saturated at a low luminance, a pixel value of a mode with a large output gain may be smaller at the same luminance. Hereinafter, the operation of the signal processor will be described in detail with reference to FIGS. 8A and 8B.

Figure 8B:
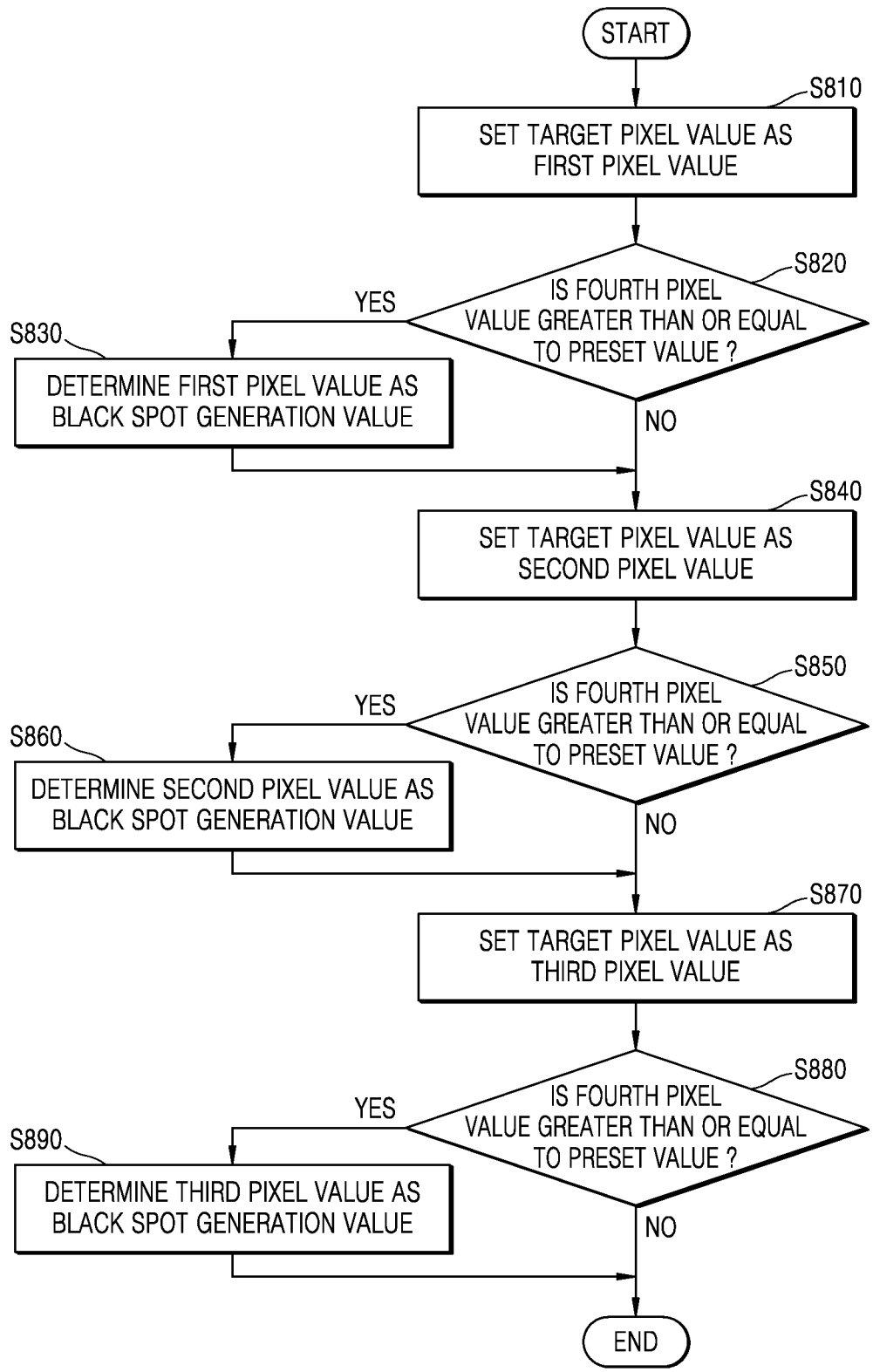
FIG. 8B is a flowchart illustrating the operation of a signal processor according to an embodiment of the present disclosure.

FIG. 8B is a flowchart illustrating the operation of a signal processor according to an embodiment of the present disclosure. For example, the flowchart of FIG. 8B may represent an example of operation S620 of FIG. 6. Hereinafter, FIG. 8A is also referred to.

A signal processor (e.g., the signal processor 190 of FIGS. 4 and 5) may determine whether a target pixel value is a black spot generation value based on at least one of comparison pixel values. In an embodiment, the signal processor may determine whether a target pixel value is a black spot generation value based on a comparison pixel value of a mode having the smallest output gain among comparison modes.

Referring to FIGS. 8A and 8B, in operation S810, the signal processor may set the target pixel value as the first pixel value. When the target pixel value is the first pixel value, the mode having the smallest output gain among the comparison modes is the fourth mode, and the comparison pixel value is the fourth pixel value. The signal processor may determine whether the first pixel value is a black spot generation value based on the fourth pixel value.

The signal processor may determine whether a comparison pixel value of a mode having the smallest output gain among comparison modes is equal to or greater than a preset value. In operation S820, the signal processor may determine whether the fourth pixel value is greater than or equal to a preset value.

The signal processor may determine the target pixel value as a black spot generation value if the comparison pixel value of the mode with the smallest output gain is equal to or greater than a preset value. The signal processor may determine whether each of the first pixel value, the second pixel value, and the third pixel value is a black spot generation value based on the fourth pixel value.

The signal processor may determine the first pixel value as a black spot generation value when the fourth pixel value is equal to or greater than the preset value in operation S830. The signal processor may perform operation S840 after performing operation S830. The signal processor may perform operation S840 when the fourth pixel value is not equal to or greater than the preset value.

In an embodiment, the preset value may be set to a pixel value of a mode having the smallest output gain at a luminance in which a pixel value of a mode having a larger output gain is sufficiently saturated than a mode having the smallest output gain. For example, the fourth pixel value pk at a luminance Lm at which the first pixel value, the second pixel value, and the third pixel value are saturated may be a preset value.

Since the fourth pixel value in luminance Ln is equal to or greater than the preset value pk, the signal processor may determine the first pixel value as a black spot generation value. In an embodiment, when the fourth pixel value is greater than or equal to a preset value, the first pixel value may be saturated. If the fourth pixel value is greater than or equal to a preset value, the first pixel value may be regarded as a black spot generation value.

In an embodiment, when the comparison pixel value of the mode having the smallest output gain among the comparison modes is equal to or greater than a preset value and the target pixel value is not the maximum output value, the signal processor may determine the target pixel value as a black spot generation value. The signal processor may determine whether the target pixel value is a black spot generation value based on whether the fourth pixel value is greater than or equal to the preset value and the first pixel value is the maximum output value MAX. When the fourth pixel value is equal to or greater than the preset value, the first pixel value may be saturated with the maximum output value MAX. A black spot may occur when the first pixel value is not the maximum output value MAX even though the fourth pixel value is equal to or greater than the preset value. If the target pixel value is the first pixel value in luminance Ln, since the fourth pixel value is equal to or greater than pk and the first pixel value is not the maximum output value MAX, the signal processor may determine the first pixel value as the black spot generation value. According to an embodiment, the signal processor may correct the first pixel value to the maximum output value MAX after performing operation S830. However, the inventive concept is not necessarily limited thereto. For example, according to embodiments, when operation S830 is performed, the first pixel value may be corrected to the maximum output value MAX in operations after operation S890.

In operation S840, the signal processor may set the target pixel value as the second pixel value. When the target pixel value is the second pixel value, the mode having the smallest output gain among the comparison modes is the fourth mode, and the comparison pixel value is the fourth pixel value. The signal processor may determine whether the second pixel value is a black spot generation value based on the fourth pixel value.

In operation S850, the signal processor may determine whether a fourth pixel value is greater than or equal to a preset value with respect to the second pixel value. The signal processor may determine the second pixel value as a black spot generation value when the fourth pixel value is equal to or greater than the preset value in operation S860. The signal processor may perform operation S870 when the fourth pixel value is not equal to or greater than the preset value.

Since the fourth pixel value in luminance Ln is equal to or greater than the preset value pk, the signal processor may determine the second pixel value as a black spot generation value. In an embodiment, when the fourth pixel value is greater than or equal to a preset value, the second pixel value may be saturated. If the fourth pixel value is greater than or equal to a preset value, the second pixel value may be regarded as a black spot generation value. According to an embodiment, the signal processor may correct the second pixel value to the maximum output value MAX after performing operation S860. However, the inventive concept is not necessarily limited thereto. For example, according to embodiments, when operation S860 is performed, the second pixel value may be corrected to the maximum output value MAX in operations after operation S890.

In an embodiment, when the comparison pixel value of the mode having the smallest output gain among the comparison modes is equal to or greater than a preset value and the target pixel value is not the maximum output value, the signal processor may determine the target pixel value as a black spot generation value. The signal processor may determine whether the target pixel value is a black spot generation value based on whether the fourth pixel value is greater than or equal to the preset value and the second pixel value is the maximum output value MAX. When the fourth pixel value is equal to or greater than the preset value, the second pixel value may be saturated with the maximum output value MAX. A black spot may occur when the second pixel value is not the maximum output value MAX even though the fourth pixel value is equal to or greater than the preset value. If the target pixel value is the second pixel value in luminance Ln, since the fourth pixel value is equal to or greater than pk and the second pixel value is the maximum output value MAX, the signal processor may not determine the second pixel value as a black spot generation value.

In operation S870, the signal processor may set the target pixel value as the third pixel value. When the target pixel value is the third pixel value, the mode having the smallest output gain among the comparison modes is the fourth mode, and the comparison pixel value is the fourth pixel value. The signal processor may determine whether the third pixel value is a black spot generation value based on the fourth pixel value.

In operation S880, the signal processor may determine whether a fourth pixel value is greater than or equal to a preset value with respect to the third pixel value. The signal processor may determine the third pixel value as a black spot generation value when the fourth pixel value is equal to or greater than the preset value in operation S890.

Since the fourth pixel value in luminance Ln is equal to or greater than the preset value pk, the signal processor may determine the third pixel value as a black spot generation value. In an embodiment, when the fourth pixel value is greater than or equal to a preset value, the third pixel value may be saturated. If the fourth pixel value is greater than or equal to a preset value, the third pixel value may be regarded as a black spot generation value. According to an embodiment, the signal processor may correct the third pixel value to the maximum output value MAX after performing operation S890.

The signal processor may determine whether the target pixel value is a black spot generation value based on whether the fourth pixel value is greater than or equal to the preset value and the third pixel value is the maximum output value MAX. When the fourth pixel value is equal to or greater than the preset value, the third pixel value may be saturated with the maximum output value MAX. A black spot may occur when the third pixel value is not the maximum output value MAX even though the fourth pixel value is equal to or greater than the preset value. If the target pixel value is the third pixel value in luminance Ln, since the fourth pixel value is equal to or greater than pk and the third pixel value is the maximum output value MAX, the signal processor may not determine the third pixel value as a black spot generation value.

In addition, although FIG. 8B shows that the black spot generation value is determined in the order in which the first pixel value, the second pixel value, and the third pixel value are listed, the inventive concept is not necessarily limited thereto. For example, according to embodiments, the order may be changed. Also, according to embodiments, operations S850 and S880 may be omitted.

Figure 9:
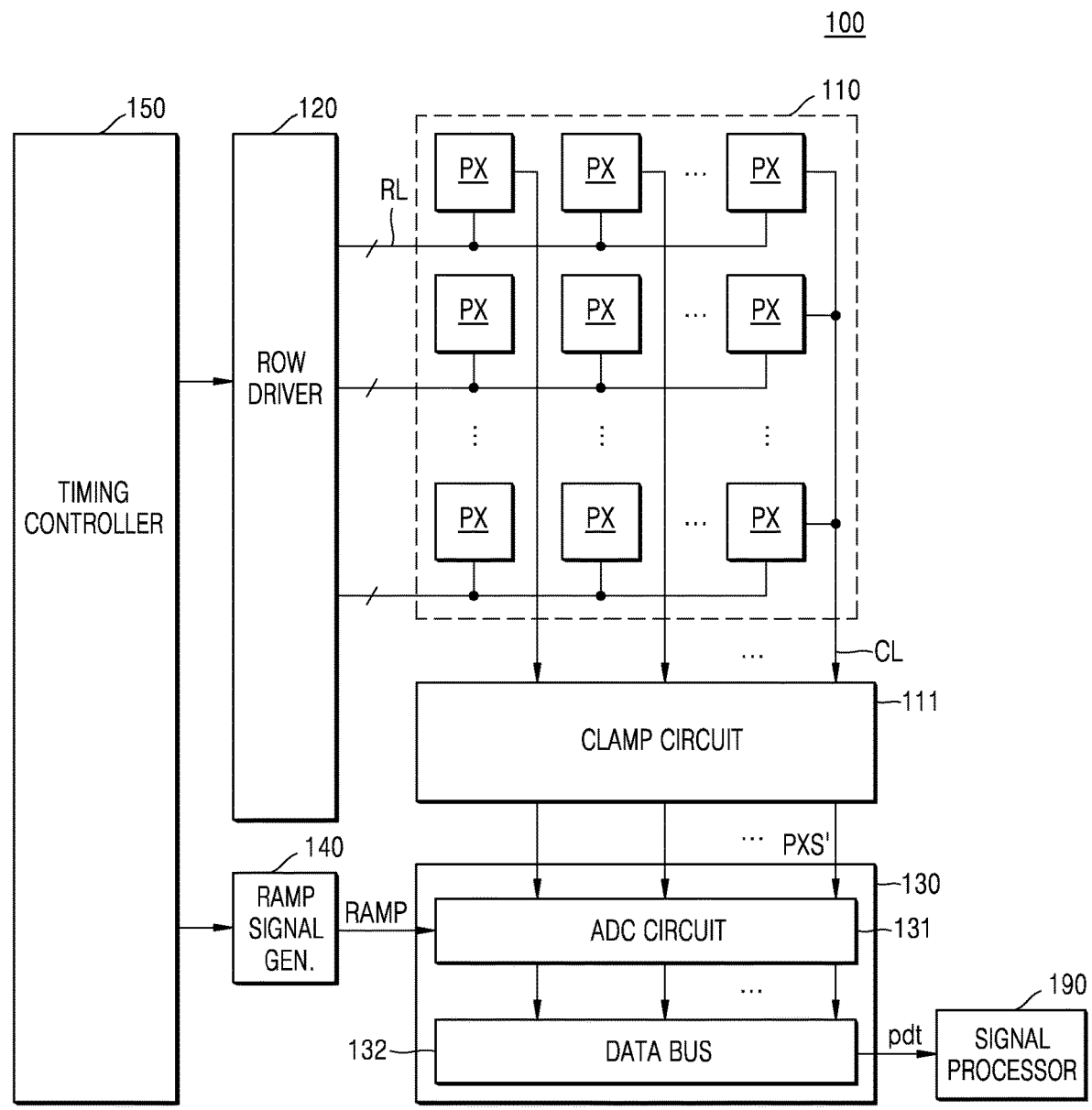
FIG. 9 is a diagram illustrating a clamp circuit according to an embodiment of the present disclosure.

FIG. 9 is a diagram illustrating a clamp circuit according to an embodiment of the present disclosure. Compared to FIG. 1, the image sensor 100 of FIG. 9 may include a clamp circuit 111. For convenience of explanation, a further description of components and technical aspects previously described may be omitted.

Referring to FIG. 9, the image sensor 100 may include a clamp circuit 111. The clamp circuit 111 may receive the pixel signal PXS from the pixels PX. The clamp circuit 111 may refer to an analog circuit that clamps the pixel signal PXS to a preset voltage based on the pixel signal PXS.

The clamp circuit 111 may include a plurality of clamp circuits corresponding to the plurality of column lines CL, and each of the plurality of clamp circuits may clamp the pixel signal to a preset voltage based on the pixel signal received through the corresponding column line CL. The clamp circuit 111 may prevent the voltage of the column line CL, that is, the voltage level of the pixel signal PXS, from dropping below a preset voltage level. For example, the clamp circuit 111 may clamp the reset signal to a preset voltage. The clamp circuit 111 does not operate when an image signal is read from the pixel PX, but operates when a reset signal is read.

In an embodiment, the timing controller 150 may provide a clamp control signal to the clamp circuit 111. The clamp circuit 111 may operate based on the clamp control signal. For example, when an image signal is read from the pixel PX, the clamp circuit 111 may not operate based on the clamp control signal. When the reset signal is read, the clamp circuit 111 may operate based on the clamp control signal. The clamp circuit 111 may clamp the reset signal to a preset voltage level when the reset signal is below a preset level. The clamp circuit 111 may output the reset signal as it is when the reset signal exceeds a preset level.

For example, the clamp circuit 111 may include a clamp transistor and a clamp selection transistor. When an image signal is read from the pixel PX, the clamp selection transistor is turned off based on the clamp control signal, so that the clamp circuit 111 may not operate. When the reset signal is read, the clamp selection transistor is turned on based on the clamp control signal so that the clamp circuit 111 may operate. The clamp circuit 111 may clamp the reset signal to a preset voltage level through a clamp transistor and a clamp selection transistor when the reset signal is below a preset level.

Each of the plurality of pixels PX may operate in a plurality of modes. Each of the plurality of pixels PX may output a pixel signal corresponding to each of a plurality of modes. Each of the plurality of modes may have different output gains. The clamp circuit 111 may receive a pixel signal PXS corresponding to each of a plurality of modes from the pixel PX.

In an embodiment, the clamp circuit 111 may clamp a pixel signal corresponding to a mode having the smallest output gain among a plurality of modes. The clamp circuit 111 may operate when the pixel signal PXS corresponding to the mode having the smallest output gain is read. The clamp circuit 111 may not operate when pixel signals PXS corresponding to modes other than the mode having the smallest output gain are read out. When the pixel signal PXS corresponding to the mode in which the output gain is the smallest is read from the pixel PX, the clamp circuit 111 may operate.

For example, each of the plurality of pixels PX may operate in the first to fourth modes. An output gain of the fourth mode among the first to fourth modes may be the smallest. The clamp circuit 111 may operate when the pixel signal PXS corresponding to the fourth mode is read. For example, the clamp circuit 111 may not operate when an image signal corresponding to the fourth mode is read, and may operate when a reset signal is read. The clamp circuit 111 may clamp the reset signal to a preset voltage level when the reset signal corresponding to the fourth mode is below a preset level. The clamp circuit 111 may output the reset signal as it is when the reset signal corresponding to the fourth mode exceeds a preset level.

Although the clamp circuit 111 is illustrated as being disposed outside of the pixel array 110 in FIG. 9, the inventive concept is not necessarily limited thereto. For example, according to embodiments, the clamp circuit 111 may be implemented to be included in the pixel array 110. For example, the clamp circuit 111 may be implemented such that the pixels PX in a row adjacent to the read row in which the read operation is performed act as a clamp circuit for the pixels PX in the read row. The clamp circuit 111 that clamps the pixel signal PXS to a preset voltage may be implemented in various ways.

The clamp circuit 111 may output a pixel signal PXS'. The pixel signal PXS' may include, for example, a reset signal, an image signal, and a reset signal clamped to a preset voltage.

The readout circuit 130 may convert the pixel signal PXS' received from the clamp circuit 111 into a digital signal based on the ramp signal RAMP from the ramp signal generator 140. The readout circuit 130 may generate pixel values corresponding to a plurality of modes from the pixel signal PXS' corresponding to the plurality of modes.

The ADC circuit 131 may compare the reset signal and the image signal received from the clamp circuit 111 with the ramp signal RAMP, respectively, and generate a pixel value based on the comparison results. Upon receiving a reset signal clamped to a preset voltage from the clamp circuit 111, the ADC circuit 131 may compare the reset signal and the image signal clamped to a preset voltage with the ramp signal RAMP, respectively, and generate a pixel value based on the comparison results.

An image sensor according to an embodiment of the present disclosure may determine whether a target pixel value is a black spot generation value by using a pixel value of a mode according to an output gain, and correct the pixel value. By correcting the pixel value, black spots are removed from the image generated by the image sensor, and the quality of the image may be increased. In addition, the quality of an image may be increased by removing a black spot from a pixel signal corresponding to a mode having the smallest output gain through the clamp circuit 111. By applying the clamp circuit 111 only to the pixel signal corresponding to the mode in which the output gain is the smallest, restrictions on the level of the pixel signal may be reduced.

Figure 10:
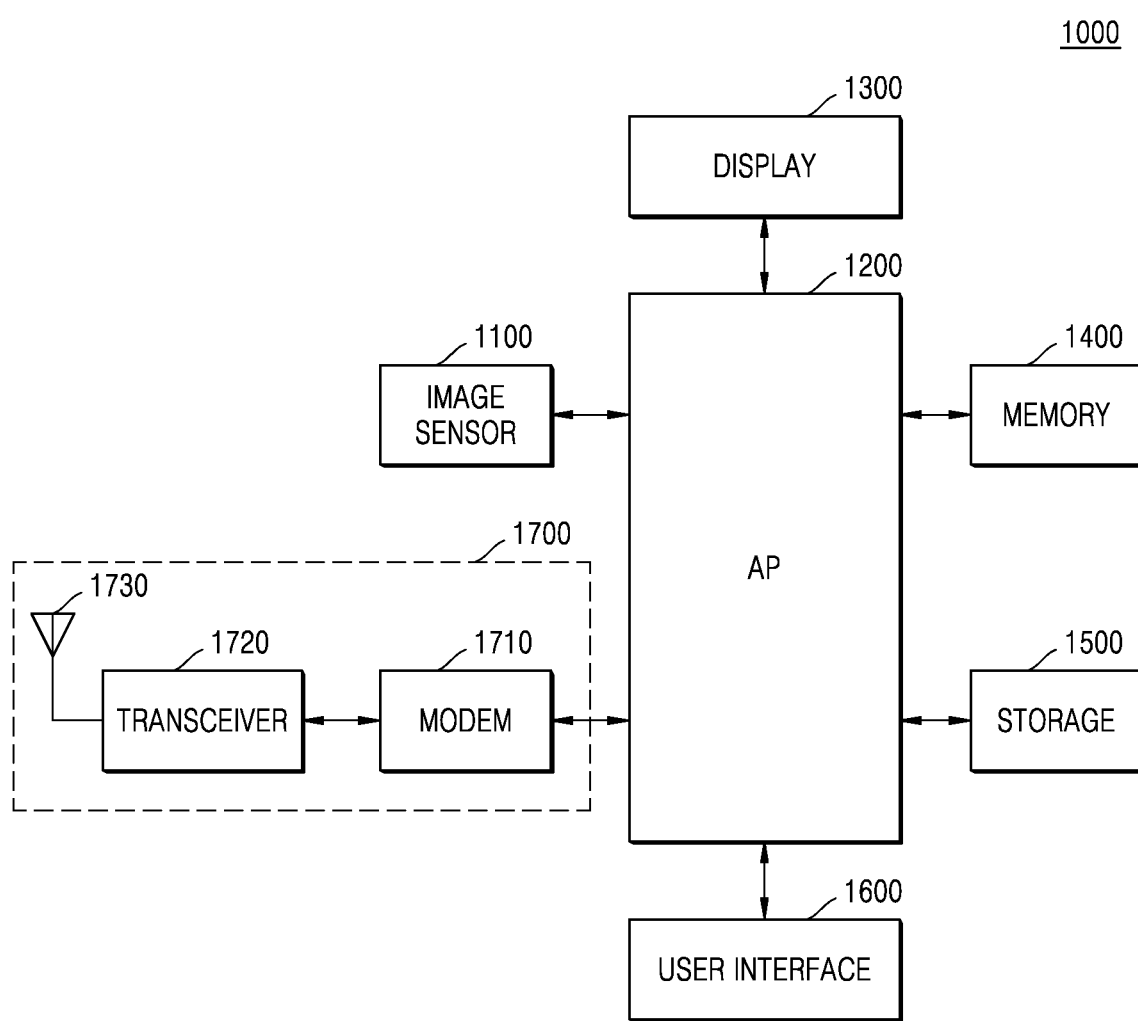
FIG. 10 is a block diagram illustrating an electronic device according to an embodiment of the present disclosure.

FIG. 10 is a block diagram illustrating an electronic device according to an embodiment of the present disclosure.

Referring to FIG. 10, the electronic device 1000 may include an image sensor 1100, an application processor 1200, a display 1300, a memory 1400, a storage 1500, a user interface 1600, and a wireless transceiver 1700. The image sensor 1100 of FIG. 10 may correspond to the image sensor 100 of FIGS. 1 and 9. For convenience of explanation, a further description of components and technical aspects previously described may be omitted.

The application processor 1200 may control the overall operation of the electronic device 1000 and may be provided as a system-on-chip (SoC) that drives an application program, an operating system, and the like. The application processor 1200 may receive image data from the image sensor 1100 and may perform image processing on the received image data. The image sensor 1100 may include a signal processor (e.g., signal processor 190 of FIG. 1).

The signal processor of the image sensor may determine whether a pixel value is a black spot generation value, correct the pixel value, and output the corrected pixel value as image data. The signal processor may correct and signal-process pixel values and output the corrected and signal-processed pixel values as image data. In some embodiments, the application processor 1200 may store the received image data and/or processed image data in the memory 1400 or the storage 1500.

The memory 1400 may store programs and/or data processed or executed by the application processor 1200. The storage 1500 may be implemented as a nonvolatile memory device such as, for example, a NAND flash or a resistive memory, and for example, the storage 1500 may be provided as a memory card (MMC, eMMC, SD, and micro SD) or the like. The storage 1500 may store data and/or programs for execution algorithms that control the image processing operation of the application processor 1200, and data and/or programs may be loaded into the memory 1400 when the image processing operation is performed.

The user interface 1600 may be implemented with various devices capable of receiving user input, such as, for example, a keyboard, a curtain key panel, a touch panel, a fingerprint sensor, and a microphone. The user interface 1600 may receive a user input and provide a signal corresponding to the received user input to the application processor 1200. The wireless transceiver 1700 may include a modem 1710, a transceiver 1720, and an antenna 1730.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and details may be made therein without departing from the spirit and scope of the inventive concept as defined by the following claims.

What is claimed is:

1. An image sensor, comprising:
a pixel array including a plurality of pixels that operate in a plurality of modes;
a readout circuit configured to receive a pixel signal corresponding to each of the plurality of modes from each of the pixels, and generate, from the pixel signal, a pixel value that is a digital signal; and
a signal processor configured to determine whether a target pixel value is a black spot generation value for each of the pixels based on at least one of comparison pixel values of each comparison mode among a plurality of comparison modes having a smaller output gain than a target mode corresponding to the target pixel value, and correct the target pixel value when the target pixel value is the black spot generation value.

2. The image sensor of claim 1, wherein the signal processor corrects the target pixel value to a maximum output value when the target pixel value is the black spot generation value.

3. The image sensor of claim 1, wherein the signal processor determines the target pixel value as the black spot generation value when the target pixel value is smaller than at least one of the comparison pixel values.

4. The image sensor of claim 3, wherein the signal processor determines the target pixel value as the black spot generation value when the target pixel value is smaller than a comparison pixel value of a mode having a largest output gain among the comparison modes.

5. The image sensor of claim 1, wherein the signal processor determines whether the target pixel value is the black spot generation value based on a comparison pixel value of a mode having a smallest output gain among the comparison modes.

6. The image sensor of claim 5, wherein the signal processor determines the target pixel value as the black spot generation value when a comparison pixel value of a mode in which the output gain is the smallest is equal to or greater than a preset value.

7. The image sensor of claim 1, wherein the signal processor determines the target pixel value as the black spot generation value when a comparison pixel value of a mode having a smallest output gain among the comparison modes is equal to or greater than a preset value and the target pixel value is not a maximum output value.

8. The image sensor of claim 1, wherein the target pixel value comprises a pixel value other than of a mode having a smallest output gain among pixel values of each of the plurality of modes.

9. The image sensor of claim 1, wherein the image sensor further comprises a clamp circuit that clamps the pixel signal to a preset voltage based on the pixel signal.

10. The image sensor of claim 9, wherein the clamp circuit clamps a pixel signal corresponding to a mode having a smallest output gain among the plurality of modes.

11. An image sensor, comprising:
a pixel array including a plurality of pixels, each including a first photoelectric conversion element and a second photoelectric conversion element having a larger light-receiving area than the first photoelectric conversion element, and a plurality of pixels each operating in a first mode, a second mode, a third mode and a fourth mode;
a readout circuit configured to receive pixel signals corresponding to the first to fourth modes from each of the plurality of pixels and generate first to fourth pixel values that are digital signals; and
a signal processor configured to determine whether each of the plurality of pixels has a pixel value that is a black spot generation value based on at least one of a first pixel value in the first mode, a second pixel value in the second mode, a third pixel value in the third mode, and a fourth pixel value in the fourth mode,
determine whether the second pixel value is the black spot generation value based on at least one of the third pixel value and the fourth pixel value, and
determine whether the third pixel value is the black spot generation value based on the fourth pixel value,
wherein the first mode has a larger output gain than the second mode, the second mode has a larger output gain than the third mode, and the third mode has a larger output gain than the fourth mode.

12. The image sensor of claim 11, wherein, when the black spot generation value is determined for each of the first pixel value, the second pixel value, and the third pixel value, the signal processor corrects the pixel value determined as the black spot generation value to a maximum output value.

13. The image sensor of claim 11, wherein the signal processor determines that the first pixel value is the black spot generation value when the first pixel value is smaller than at least one of the second pixel value, the third pixel value, and the fourth pixel value,
determines that the second pixel value is the black spot generation value when the second pixel value is smaller than at least one of the third pixel value and the fourth pixel value, and
determines the third pixel value as the black spot generation value when the third pixel value is smaller than the fourth pixel value.

14. The image sensor of claim 13, wherein the signal processor determines the first pixel value as the black spot generation value when the first pixel value is smaller than the second pixel value, and determines the second pixel value as the black spot generation value when the second pixel value is smaller than the third pixel value.

15. The image sensor of claim 11, wherein the signal processor determines whether each of the first pixel value, the second pixel value, and the third pixel value is the black spot generation value based on the fourth pixel value.

16. The image sensor of claim 15, wherein when the fourth pixel value is greater than or equal to a preset value, the signal processor determines each of the first pixel value, the second pixel value, and the third pixel value as a black spot generation value, and corrects the value to a maximum output value.

17. The image sensor of claim 11, wherein the signal processor determines whether each of the first pixel value, the second pixel value, and the third pixel value is the black spot generation value based on whether the fourth pixel value is equal to or greater than a preset value, and whether each of the first pixel value, the second pixel value, and the third pixel value is a maximum output value.

18. An operating method of an image sensor including a plurality of pixels operating in a plurality of modes, the method comprising:
receiving a pixel value corresponding to each of the plurality of modes;
determining whether a target pixel value is a black spot generation value based on at least one of comparison pixel values of each comparison mode among a plurality of comparison modes having a smaller output gain than a target mode corresponding to the target pixel value; and
correcting the target pixel value based on whether the target pixel value is the black spot generation value.

19. The method of claim 18, wherein determining whether the target pixel value is the black spot generation value comprises:
determining whether a comparison pixel value of a mode having a smallest output gain among the comparison modes is equal to or greater than a preset value; and
determining whether the target pixel value corresponds to a maximum output value.

20. The method of claim 18, wherein correcting the target pixel value comprises correcting the target pixel value to a maximum output value when the target pixel value is determined to be the black spot generation value.

* * * * *